US009756675B2

United States Patent
Lee et al.

(10) Patent No.: US 9,756,675 B2
(45) Date of Patent: Sep. 5, 2017

(54) METHOD BY WHICH TERMINAL FOR SUPPORTING MULTIPLE RADIO ACCESS TECHNOLOGIES RECOVERS WHEN RADIO LINK FAILURE HAS OCCURRED AND DEVICE FOR SAME

(71) Applicant: LG ELECTRONICS INC., Seoul (KR)

(72) Inventors: Eunjong Lee, Anyang-si (KR); Heejeong Cho, Anyang-si (KR); Jaehoon Chung, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 60 days.

(21) Appl. No.: 14/437,469

(22) PCT Filed: Nov. 4, 2013

(86) PCT No.: PCT/KR2013/009904
§ 371 (c)(1),
(2) Date: Apr. 21, 2015

(87) PCT Pub. No.: WO2014/069959
PCT Pub. Date: May 8, 2014

(65) Prior Publication Data
US 2015/0264738 A1 Sep. 17, 2015

Related U.S. Application Data

(60) Provisional application No. 61/722,220, filed on Nov. 4, 2012.

(51) Int. Cl.
*H04W 76/02* (2009.01)
*H04W 36/00* (2009.01)
(Continued)

(52) U.S. Cl.
CPC ..... *H04W 76/027* (2013.01); *H04W 36/0072* (2013.01); *H04W 76/028* (2013.01); *H04W 24/04* (2013.01); *H04W 88/06* (2013.01)

(58) Field of Classification Search
None
See application file for complete search history.

(56) References Cited

U.S. PATENT DOCUMENTS

2010/0267378 A1* 10/2010 Hamabe ............. H04W 24/10
455/423
2011/0019532 A1* 1/2011 Jung .................. H04W 76/028
370/216
(Continued)

FOREIGN PATENT DOCUMENTS

JP 2009-112007 5/2009
JP 2010530181 9/2010
(Continued)

OTHER PUBLICATIONS

PCT International Application No. PCT/KR2013/009904, Written Opinion of the International Searching Authority dated Feb. 12, 2014, 26 pages.
(Continued)

*Primary Examiner* — Tejis Daya
(74) *Attorney, Agent, or Firm* — Lee, Hong, Degerman, Kang & Waimey

(57) ABSTRACT

A method by which a terminal for supporting multiple radio access technologies (multi-RAT) recovers when a radio link failure has occurred can comprise the steps of: detecting a radio link failure of a first RAT while maintaining an RRC connection state with the first RAT; determining the radio link failure if a radio link of the first RAT does not recover after a predetermined first time elapses after the detection; and determining whether the radio link failure of the first (Continued)

RAT recovers during a predetermined second time after the determination.

8 Claims, 17 Drawing Sheets

(51) Int. Cl.
*H04W 24/04* (2009.01)
*H04W 88/06* (2009.01)

(56) References Cited

U.S. PATENT DOCUMENTS

| | | |
|---|---|---|
| 2011/0077010 A1 | 3/2011 | Xu et al. |
| 2011/0183663 A1* | 7/2011 | Kenehan ............. H04W 76/048 455/423 |
| 2012/0069728 A1* | 3/2012 | Jung ................... H04W 76/027 370/216 |
| 2013/0295939 A1* | 11/2013 | Wegmann ........... H04W 76/028 455/436 |
| 2014/0112155 A1* | 4/2014 | Lindoff ................ H04W 24/08 370/242 |

FOREIGN PATENT DOCUMENTS

| | | |
|---|---|---|
| KR | 10-2009-0045046 | 5/2009 |
| KR | 10-2010-0129690 | 12/2010 |
| WO | 2011/146083 | 11/2011 |
| WO | WO2012065646 * | 5/2012 |
| WO | 2012/138079 | 10/2012 |

OTHER PUBLICATIONS

Nokia et al., "Radio Link Failure Recovery" 3GPP TSG-RAN WG2 Meeting #58, R2-072382, Jun. 25-29, 2007, 3 pages.

* cited by examiner

METHOD BY WHICH TERMINAL FOR SUPPORTING MULTIPLE RADIO ACCESS TECHNOLOGIES RECOVERS WHEN RADIO LINK FAILURE HAS OCCURRED AND DEVICE FOR SAME

CROSS-REFERENCE TO RELATED APPLICATIONS

This application is the National Stage filing under 35 U.S.C. 371 of International Application No. PCT/KR2013/009904, filed on Nov. 4, 2013, which claims the benefit of U.S. Provisional Application No. 61/722,220, filed on Nov. 4, 2012, the contents of which are all hereby incorporated by reference herein in their entirety.

TECHNICAL FIELD

The following description relates to wireless communication and, more specifically, to a method by which a UE for supporting multiple radio access technologies recovers from radio link failure when the radio link failure has occurred, and a device for the same.

BACKGROUND ART

A multi-RAT UE having capability to access two or more radio access technologies (RATs) can be present. To access a specific RAT, connection to the specific RAT is established on the basis of a request of the UE and transmission and reception of data are performed.

However, the multi-RAT UE cannot simultaneously access multiple RATs even though the multi-RAT UE has capability to access two or more RAT. That is, current UEs cannot simultaneously transmit and receive data through different RATs even if the UEs have multi-RAT capability.

Conventional multi-RAT has a problem of low system efficiency since the conventional multi-RAT does not require interworking between a wireless LAN and a cellular network. Furthermore, the problem has not been studied.

DISCLOSURE

Technical Problem

A technical object of the present invention is to provide a method by which a UE for supporting multi-RAT recovers from radio link failure upon occurrence of radio link failure.

Another technical object of the present invention is to provide a UE for recovering from radio link failure.

The technical objects that can be achieved through the present invention are not limited to what has been particularly described hereinabove and other technical objects not described herein will be more clearly understood by persons skilled in the art from the following detailed description.

Technical Solution

In an aspect of the present invention, a method of recovering a radio link by a user equipment (UE) for supporting multiple radio access technologies (RATs) (multi-RAT UE) when a radio link failure occurs, includes: detecting a radio link failure of a first RAT while maintaining an RRC connection state with the first RAT; determining radio link failure when the radio link of the first RAT does not recover after a predetermined first time elapses after detection of the radio link failure; and determining whether the radio link failure of the first RAT recovers during a predetermined second time after the determining. The method may further include transmitting a message indicating the radio link failure of the first RAT through a second RAT to an entity for managing interworking of the multiple RATs after the detecting. The method may further include entering an RRC idle mode when the radio link failure of the first RAT is not recovered within the predetermined second time. The method may further include transmitting a message indicating entry to the RRC idle mode to the entity for managing interworking of multiple RATs through the second RAT. The method may further include performing an RRC connection re-establishment procedure with a base station of the first RAT when the radio link failure of the first RAT is recovered within the predetermined second time. The multiple RATs may correspond to heterogeneous networks from each other.

In another aspect of the present invention, provided herein is a user equipment (UE) for recovering a radio link when a radio link failure occurs, including a processor configured to detect a radio link failure of a first RAT while maintaining an RRC connection state with the first RAT, to determine radio link failure when the radio link of the first RAT is not recovered after a predetermined first time elapses after the detection of radio link failure and to determine whether the radio link failure of the first RAT is recovered within a predetermined second time after the determination. The UE may further include a transmitter configured to transmit a message indicating the radio link failure of the first RAT through a second RAT to an entity for managing interworking of the multiple RATs after the detection. The processor may be configured to perform an RRC connection re-establishment procedure with a BS of the first RAT when the radio link failure of the first RAT is recovered within the predetermined second time.

Advantageous Effects

When a UE has capability of simultaneously accessing two or more RATs, the UE can notify an interworking management entity or a serving BS that a link of a RAT from among the two or more RATs is available during radio link failure of a primary link from among the two or more RATs such that an urgent message or a data flow of the UE can be switched to a secondary RAT.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
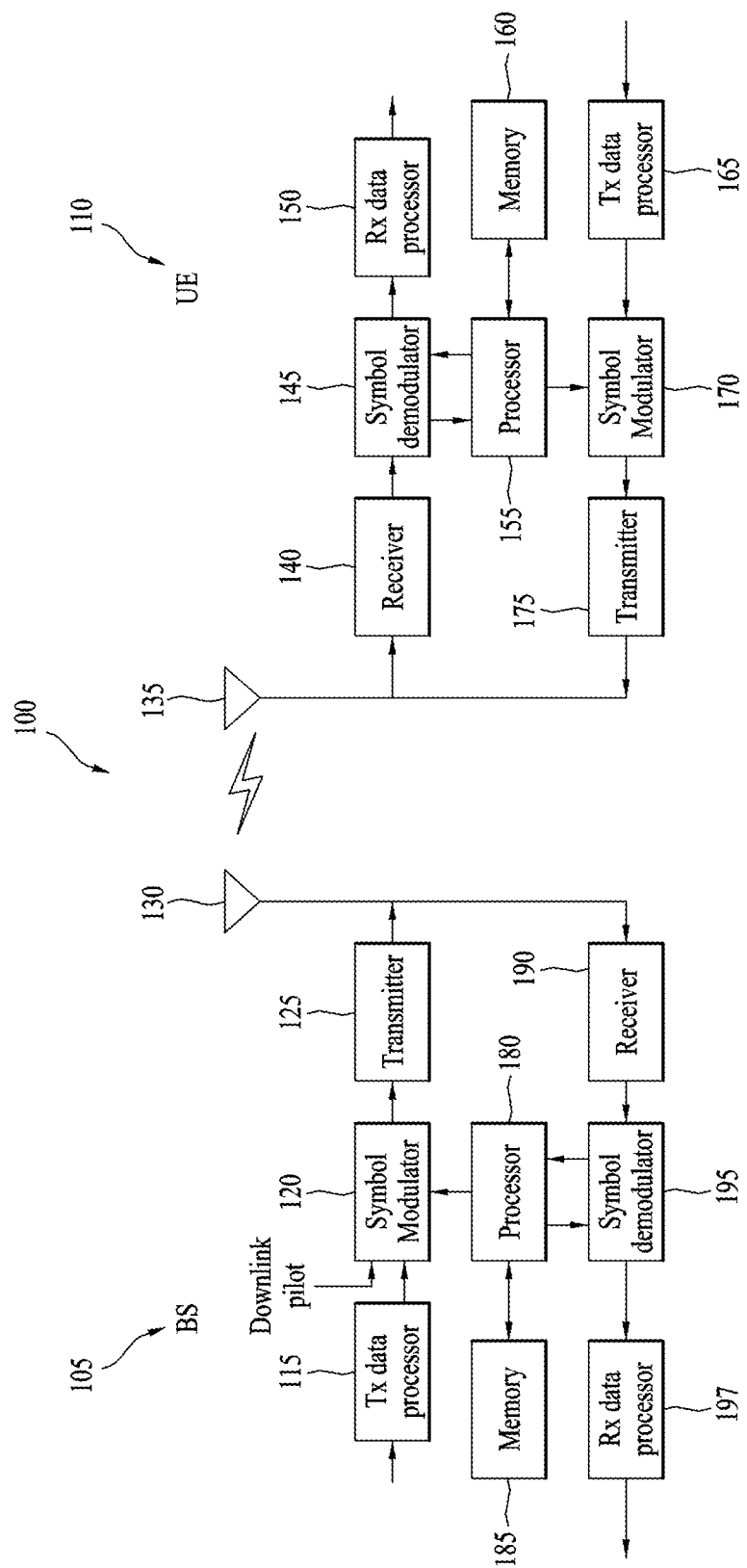
FIG. 1 is a block diagram showing configurations of a base station (BS) 105 and a UE 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (BS), an access point (AP) and the like. Although the present specification is described based on 3GPP LTE system or 3GPP LTE-A system, contents of the present invention may be applicable to various kinds of other communication systems.

In a mobile communication system, a user equipment is able to receive information in downlink and is able to transmit information in uplink as well. Informations transmitted or received by the user equipment node may include various kinds of data and control informations. In accordance with types and usages of the informations transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

Figure 2:
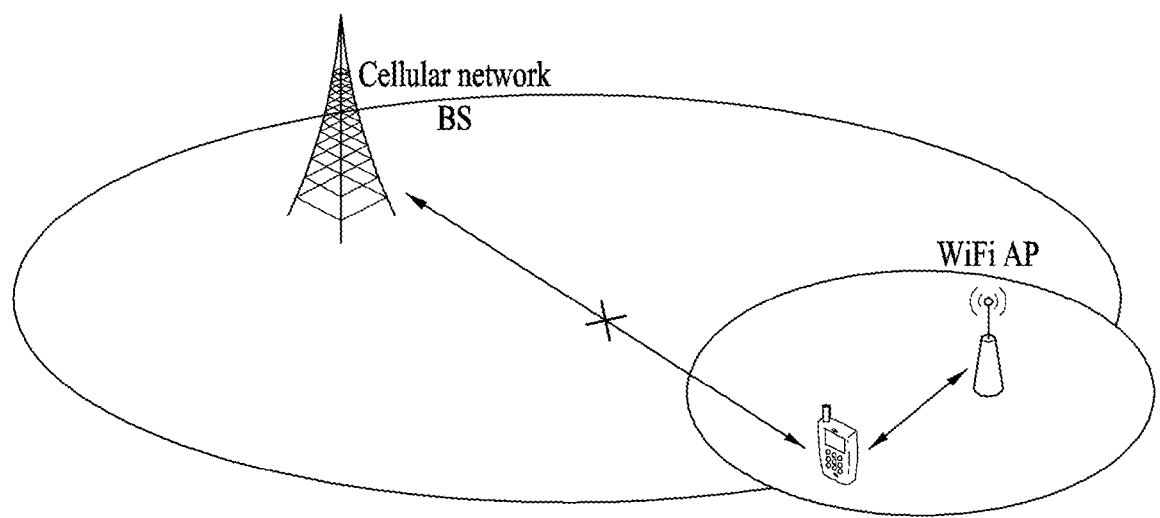
FIG. 2 illustrates cellular radio link failure.

FIG. 2 illustrates cellular radio link failure.

A conventional UE cannot simultaneously transmit and receive data through different RATs even though the UE has multi-RAT capability. Since switching based inter-RAT switches transmitted data to other RAT, a RAT suitable for QoS of a flow cannot be selected and a control technology for switching only a specific flow has not been defined. Accordingly, it is necessary to define a procedure and signaling information for switching only a specific flow to other RAT. The present invention defines procedures through which a UE adds/deletes/modifies a secondary system for transmission of a specific flow in addition to a primary system. When a UE connected with a cellular network through a WLAN detects link failure of the cellular network, the UE requires a method for efficiently performing link recovery of the cellular network through the WLAN. When a conventional method is used, a BS or a specific network entity that manages cellular-Wi-Fi interworking can detect radio link failure of the UE after the UE recovers the cellular radio link, and thus the BS or the specific network entity cannot provide any service to the UE during RLF even if a Wi-Fi link has been established.

However, in the case of a UE capable of simultaneously establishing connections with two links of a cellular network and a Wi-Fi network, the Wi-Fi link may be available even if the cellular link fails. Accordingly, the UE requires a method for transmitting an urgent message or data, which needs to be transmitted through the cellular network, via the Wi-Fi network by rapidly notifying the BS or the interworking management network entity of link failure of the cellular network through the available Wi-Fi link.

A network structure in which a plurality of communication systems interwork will be described first.

Figure 3:
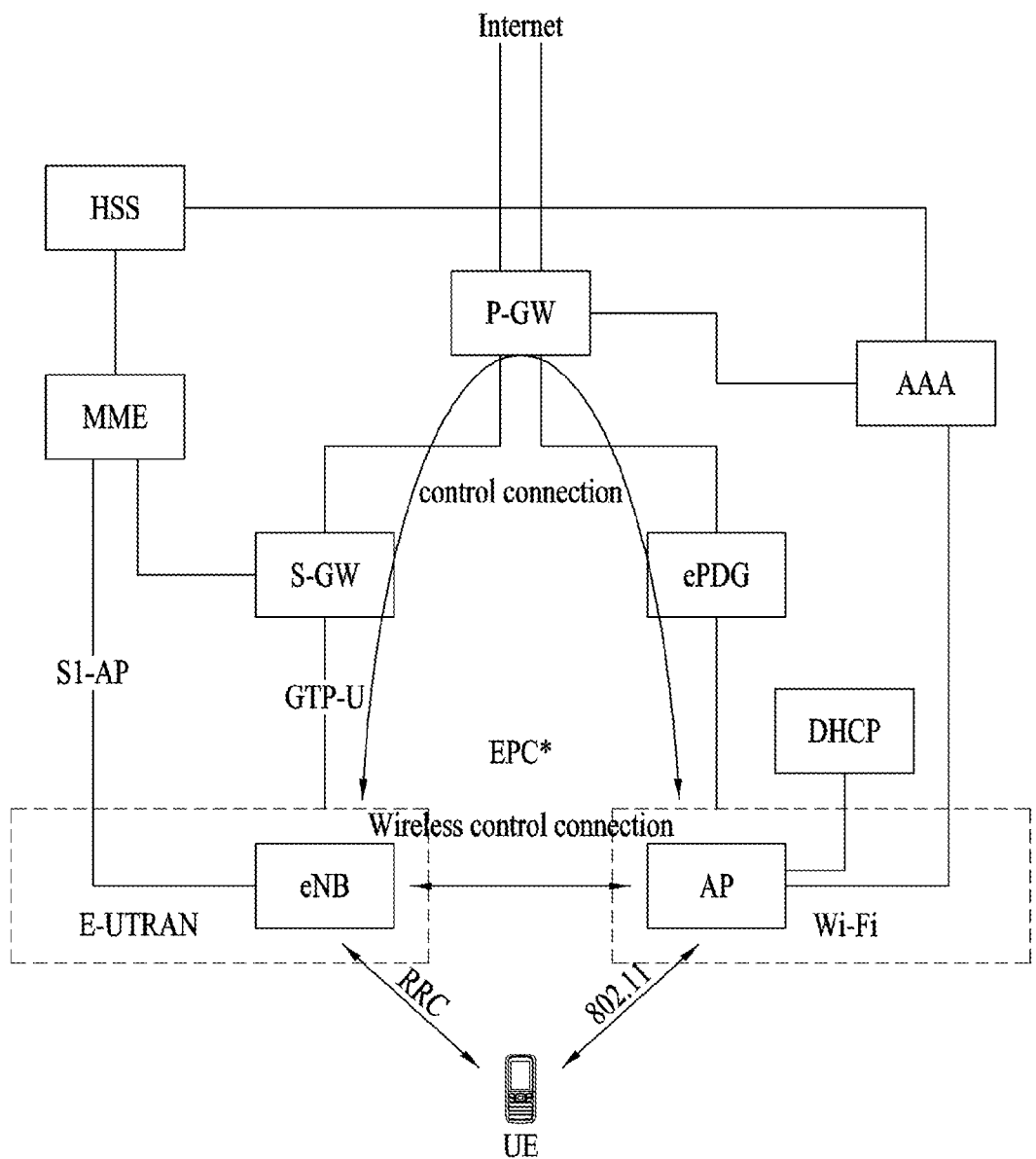
FIG. 3 illustrates a network structure for describing interworking of a first communication system (e.g. LTE system) and a second communication system (e.g. Wi-Fi system).

FIG. 3 illustrates a network structure for describing interworking between a first communication system (e.g. LTE system) and a second communication system (e.g. Wi-Fi system).

In the network structure shown in FIG. 3, backhaul control connection or wireless control connection between an AP and a BS may be provided through a backbone network (e.g. P-GW or EPC (Evolved Packet Core)). For peak throughput and data traffic off-loading, a UE can simultaneously support a first communication system (or first communication network) using a first wireless communication scheme and a second communication system (or second communication network) using a second wireless communication scheme through interworking between multiple communication networks. Here, the first communication network or the first communication system may be referred to as a primary network or a primary system and the second communication network or the second communication system may be referred to as a secondary network or a secondary system. For example, the UE can be configured to simultaneously support LTE (or LTE-A) and Wi-Fi (short range communication system such as WLAN/802.11). Such UE may be referred to as a multi-system capability UE in the specification.

In the network structure shown in FIG. 3, the primary system has wider coverage and may be a network for control information transmission. For example, the primary system can be a WiMAX or LTE (LTE-A) system. The secondary system is a network having narrower coverage and may be a system for data transmission. For example, the secondary network can be a wireless LAN system such as WLAN or Wi-Fi.

A UE having capability of simultaneously accessing two or more RATs is defined as a multi-RAT UE in the specification. To access a specific RAT, connection to the specific RAT is established and data transmission and reception are performed on the basis of a request of the UE. A conventional UE cannot simultaneously access multiple RATs even if the UE has capability of accessing two or more RATs. For example, when a UE accesses AP 1 of a Wi-Fi network, the UE performs switching operation in order to access a BS of a cellular network and cannot simultaneously access AP1 and the BS. Referring to FIG. 3, direct communication can be performed since wireless control connection is established between the AP and the BS. From the viewpoint of the BS, the AP of the secondary system can be regarded as an entity that operates in the same manner as a UE having LTE capability. Meanwhile, it is possible to consider a scenario in which backhaul control connection is established between the AP and the BS through the backbone network, which is not shown in FIG. 3. In this case, the AP and the BS can exchange control information and the like through backhaul control connection.

A description will be given of multi-RAT system related definitions in the specification.

Primary System

A primary system (e.g. WiMAX or LTE system) is a system having wider coverage. The primary system refers to a network which is connected to a network in a status (or RRC-connected) with a multi-system capability UE or is in a DRX (Discontinuous Reception) or idle status.

The multi-system capability UE can indicate presence of capability for heterogeneous networks (e.g. WLAN) to a BS of the primary network during connection establishment with the primary network. Here, indication of multi-system capability can be included as a new field in an RRCConnectionRequest or RRCConnectionSetup message and transmitted. When the indication of multi-system capability (e.g. WLANAccessAvailable or MultiRATAccessAvailable) is 1, the multi-system capability UE and the BS can share capability necessary for multiple systems through a specific procedure for the multi-system capability UE.

The BS of the primary system can periodically transmit information about other systems (secondary systems) belonging to the same coverage through a broadcast message or a unicast message for multi-system capability UEs. When deployment of secondary systems is changed, the BS can transmit an updated message in order to notify addition/deletion/change of secondary systems.

Secondary Systems

A secondary system is a system having narrower coverage and can be a WLAN or Wi-Fi system, for example. The secondary system can be added or deleted as necessary. The secondary system can be mainly used for data transmission and reception requiring a higher bandwidth (BW). Here, a specific flow (QoS) can be mapped.

Connection between a secondary system and a UE or release of the connection can be performed after verification of the primary system. Here, connection can refer to preparation to transmit and receive data or transmission and reception of data.

When UE entry to secondary system coverage is detected, information on access to the secondary system can be received through the primary system. In this case, actual data transmission and reception may not be immediately performed. When the UE has data to transmit and receive through the secondary system, the UE can receive access information about the corresponding flow through the primary system. In this case, actual data transmission and reception can be immediately performed.

Initial Connection Establishment with the Primary System

Initial connection establishment with the primary system refers to performing the initial RRC connection establishment procedure of LTE. It is possible to indicate that the corresponding UE is a multi-RAT AMS through an RRC connection request message or an RRC connection setup message (e.g. RRCConnectionRequest/RRCConnectionSetup message). A parameter such as "MultiRATAccessAvailable" (e.g. 1 bit) can be added to an existing message and transmitted.

Secondary System Information Transmission

When there is common information of APs, which needs to be received by a UE, the corresponding BS can broadcast information about secondary systems.

Multi-RAT Capability Negotiation

Multi-RAT capability negotiation is performed after initial connection establishment, in general. In the case of connection reconfiguration, multi-RAT capability negotiation can be omitted. In the case of handover (HO), a target BS can perform pre-negotiation through a backbone network from a serving BS. The BS can store multi-RAT capability of a UE for a predetermined time after the UE enters an RRC_IDLE state. This operation can be omitted when network reconfiguration is performed before multi-RAT information retain timeout.

1. UECapabilityEnquiry

A parameter with respect to a new RAT (i.e., unlicensed band) such as Wi-Fi, WLAN or 802.11 can be added to ue-CapabilityRequest.

2. UECapabilityInformation Message

Wi-Fi related capability information of a UE can be added to this message and transmitted. A new parameter Wi-Fi or 802.11 with respect to RAT-Type is added and, when the message is transmitted together with the parameter, the following information can be additionally transmitted.

802.11 MAC address of the UE (for authentication information)

Information on a pre-accessed AP (UE's preferred AP) (this value is preferably transmitted only to a BS to which the pre-accessed AP belongs.)

Protocol Version (11a/b/n . . . ) information

Traffic characteristics required to be transmitted through a WLAN (or secondary system)

3. UECapabilityComplete or UECapabilityResponse Message (New Message)

A UE can receive information about candidate APs through the UECapabilityComplete or UECapabilityResponse message.

LTE Based UE Capability Negotiation

The present invention proposes a method by which a BS having capability for interworking of heterogeneous networks such as a WLAN can receive heterogeneous network related information of a UE by transmitting a UECapabilityEnquiry message to the UE.

The following parameter can be added to the UECapabilityEnquiry message.

Wi-Fi Related UE Capability Request Parameter

The following is added to 5.6.3.3 Reception of the UECapabilityEnquiry by the UE (3GPP TS 36.331).

The UE shall:

1> set the contents of UECapabilityInformation message as follows:

2> if the ue-CapabilityRequest includes Wi-Fi and if the UE supports Wi-Fi (or WLAN or 802.11x) domain:

3> include the UE radio access capabilities for Wi-Fi within a ue-CapabilityRAT-Container and with the RAT-type set to Wi-Fi (or WLAN or 802.11x);

Wi-Fi related UE radio access capability can include an 802.11 MAC address of the UE, information on a pre-accessed AP (UE's preferred AP), protocol version (11a/b/n . . . ) information or traffic characteristics required to be transmitted through a WLAN (or secondary system).

Figure 4:
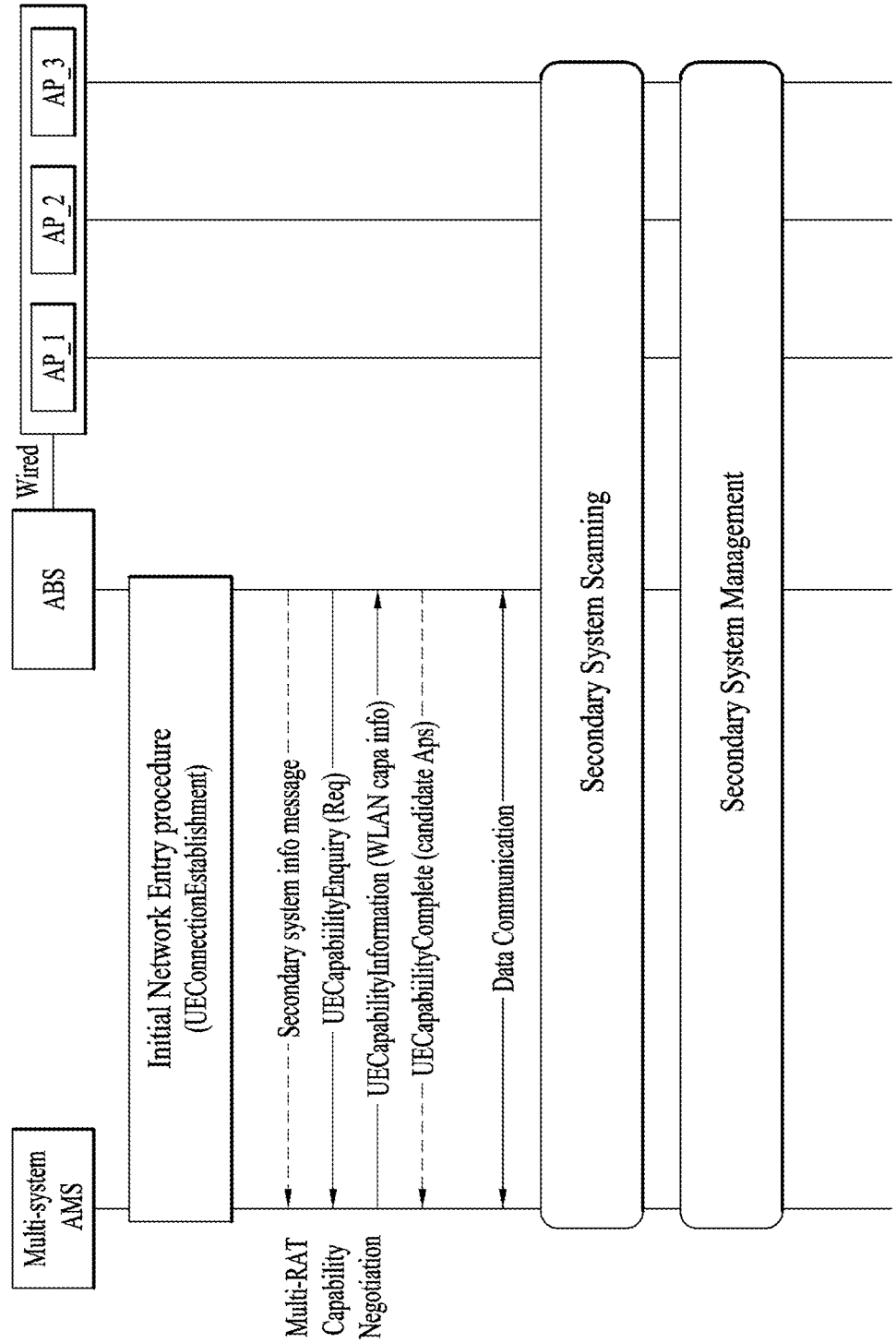
FIG. 4 illustrates a multi-system capability related negotiation procedure according to the present invention.

1> submit the UECapabilityInformation message to lower layers for transmission, upon which the procedure ends FIG. 4 illustrates a multi-system capability related negotiation procedure according to the present invention.

Particularly, FIG. 4 illustrates a negotiation procedure for LTE-based UE capability negotiation, through which a BS having capability for interworking with heterogeneous networks such as a WLAN receives heterogeneous network related information from a UE by transmitting UECapabilityEnquiry message to the UE.

Referring to FIG. 4, the UE (i.e. multi-system UE) performs an initial network entry procedure with a primary system (BS of the primary system). That is, the UE performs initial connection establishment with the primary system. When the primary system is an LTE system, the UE carries out initial RRC (Radio Resource Control) connection establishment of LTE. The BS can transmit a secondary system information message to the UE.

Multi-system (or multi-RAT) capability negotiation of the UE may be performed after initial connection establishment.

The BS can transmit a message for inquiring about capability of the UE (e.g. inquiring about whether the UE can simultaneously access multiple systems or multiple RATs or inquiring about systems or RATs which are simultaneously accessed by the UE) to the UE. This message can be referred to as "UECapabilityEnquiry". A UE-CapabilityRequest parameter is added to the UECapabilityEnquiry message and transmitted to inquire about whether the UE can simultaneously access multiple systems or multiple RATs or inquire about systems which are simultaneously accessed by the UE. The UE-CapabilityRequest parameter can include a parameter for a new RAT (i.e. unlicensed band) such as Wi-Fi, WLAN or 802.11.

The UE transmits a UECapabilityInformation message to the BS as a response to the UECapabilityEnquiry message. For example, the UECapabilityInformation message can include Wi-Fi related capability information.

The UECapabilityInformation message can include an indicator that indicates whether the UE supports simultaneous access to multiple RATs or system types and information about a supportable RAT or system type. For example, when the supportable RAT is Wi-Fi, the UECapabilityInformation message can additionally include 802.11 MAC access of the UE (for authentication information). In addition, the UECapabilityInformation message can include information on a pre-accessed AP (UE's preferred AP). This information is preferably transmitted only to a BS to which the pre-accessed AP belongs. Further, the UECapabilityInformation message can additionally include protocol version (11a/b/n . . . ) information and information about traffic type or characteristics (e.g. EPS bearer QoS type) required to be transmitted or received through a WLAN. The information about traffic type or characteristics will be described later.

Capability information about heterogeneous network interworking may be included in the UECapabilityInformation message and transmitted from the UE to the BS in an unsolicited manner without the UECapabilityEnquiry message. In this case, the BS may transmit a UECapabilityComplete message as a response to the corresponding message.

In FIG. 4, only when the UECapabilityEnquiry message is transmitted (step 1), the UE transmits the UECapabilityInformation message (step 2). In this case, the BS can transmit the UECapabilityComplete message as a response to the UECapabilityInformation message (step 3), which is optional. Accordingly, the multi-RAT capability negotiation procedure can include 2 or 3 steps.

The multi-RAT capability negotiation procedure may include 1 or 2 steps. Specifically, the UE can transmit UECapabilityInformation message to the BS in an unsolicited manner without the UECapabilityEnquiry message (step 1). In this case, the BS may transmit the UECapabilityComplete message as a response to the UECapabilityInformation message to the UE (optional) (step 2).

The UE can exchange data with the BS (S460) and select an AP by performing secondary system scanning on the basis of a candidate AP list received in step S450 (or APs). After scanning, secondary system management can be performed.

Here, trigger conditions for secondary system (e.g., AP) management are present. Prior to description of definition of the trigger conditions, QoS (Quality of Service) indicating traffic state will now be briefly described on the basis of a 3GPP LTE system.

Figure 5:
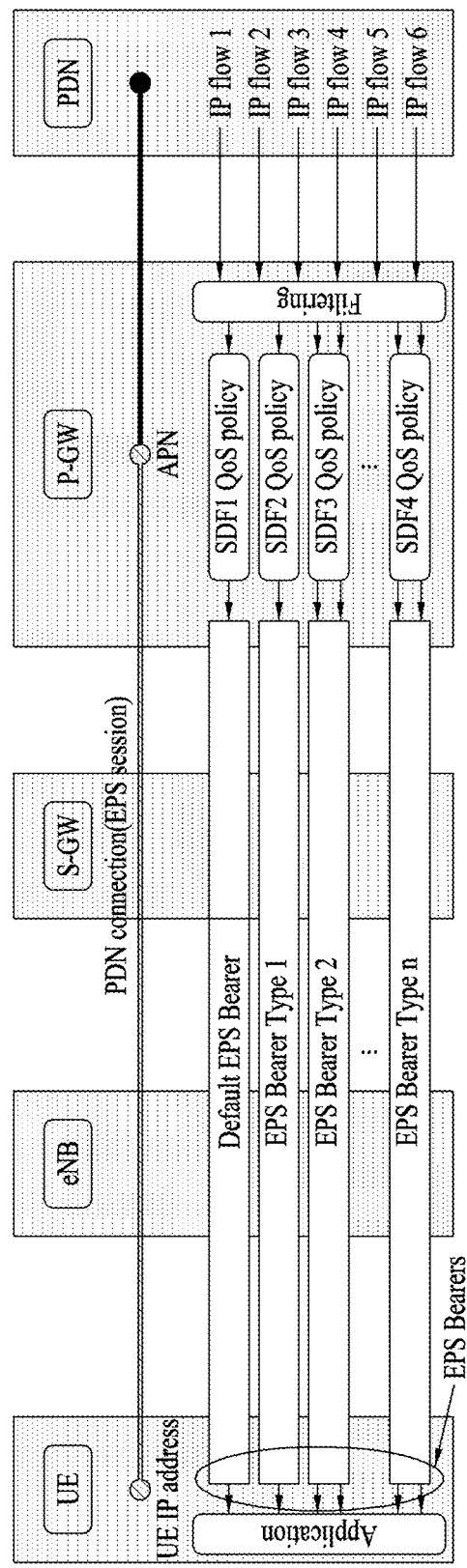
FIG. 5 illustrates traffic characteristics in an LTE system.

FIG. 5 illustrates traffic characteristics in LTE.

Referring to FIG. 5, when a UE accesses an LTE network, an EPS (Evolved Packet Service) bearer (GTP tunnel) is generated from the UE to reach a P-GW (UE-BS-S-GW-P-GW). A plurality of EPS bearers may be generated according to service characteristics. For example, an EPS bearer for the Internet, an EPS bearer for IPTV and an EPS bearer for VoIP can be generated. Characteristics of a default EPS bearer and a dedicated EPS bearer are described.

Default EPS bearer—QoS characteristic of the default EPS bearer is non-GBR (non-Guaranteed Bit Rate), for example, Internet service.

Dedicated EPS bearer—The Dedicated EPS bearer can be generated at GBR or non-GBR. For example, a dedicated EPS for VoD service is generated at GBR.

LTE QoS will now be briefly described.

LTE defines traffic characteristics at a network level (i.e. P-GW). The P-GW defines 5-tuple service data flow and a BS defines GBR or non-GBR.

PDN connection: IP connection between a UE and a PDN (the UE being identified by an IP address and the PDN being identified by APN)

EPS session: This is the same as PDN connection. An EPS session has one or more EPS bearers and is retained as long as the IP address is allocated to the UE and the UE is connected to an IP network.

EPS bearer: A transfer path established between the UE and the P-GW for transmission of IP traffic with specific QoS. Each EPS bearer is set to a QoS parameter indicating characteristics of the transfer path.

Default bearer: This is an EPS bearer initially generated when new PDN connection is generated and is maintained until the PDN connection is ended. The default bearer is always set with non-GBR.

Dedicated bearer: EPS bearer additionally generated on demand after generation of PDN connection. GBR or non-GBR.

SDF (Service Data Flow): This is an IP flow or an IP flow aggregate corresponding to a service and is identified by an IP and TCP/UDP header of a packet. QoS is applied per SDF and PCC rule is applied according to PCRF. The SDF is transmitted through an EPS bearer that can satisfy QoS thereof. Multiple SDFs can be mapped to the same EPS bearer. User traffic has QoS characteristics depending on a used service (or application). The SDF is an IP flow or an IP flow aggregate filtered per service and a specific QoS policy is applied thereto according to a UE subscriber class and used applications. IP flows directed to a user are classified into SDFs through an SDF template (classifier) according to service characteristics, and a QoS policy (e.g., bandwidth control) is applied per SDF and transmitted to the user. In an EPS transport network, QoS is mapped to an EPS bearer and transmitted.

EPS bearer: EPS bearer types include default and dedicated types, as described above. When a UE accesses an LTE network, the UE is allocated an IP address and establishes PDN connection and, at the same time, a default EPS bearer is generated. When the UE uses a service (e.g. VoD) having QoS that cannot be provided through the default bearer while using a service (e.g. Internet) through the default bearer, a dedicated bearer is generated on demand. That is, the dedicated bearer is set with QoS different from that of a previous bearer. The UE can access multiple APNs and set one default EPS bearer and multiple dedicated EPS bearers per APN. The user can set a maximum of 11 EPS bearers.

The default bearer is generated when the UE initially access the network, is maintained even when the UE does not use services and then disappears when the UE leaves the network. The default bearer is generated per APN. Provisioning of information about an APN for which the default bearer is generated and information about QoS applied when the default bearer is generated is provided to an HSS as user subscription information during initial network access. Upon initial network access of the UE, an MME downloads the user subscription information from the HSS and generates the default bearer for the corresponding PDN using a subscriber QoS profile.

SDF QoS: A QCI (QoS Class Identifier) and an ARP (Allocation and Retention Priority) are basic QoS parameters applied to all SDFs. The QCI indicates integer values (1 to 9) representing different standardized QoS characteristics. The standardized QoS characteristics are represented as a resource type, priority, a packet delay budget and a packet error loss rate. SDFs are classified into a GBR type SDF to which network resources are allocated in a fixed manner according to resource type and a non-GBR type SDF. In addition to the QCI and ARP, the GBR type SDF is a QoS parameter and is allocated a GBR (Guaranteed Bit Rate) and an MBR (Maximum Bit Rate). The non-GBR type SDF is allocated the MBR.

GBR type SDF QoS parameter: QCI, ARP, GBR (DL/UL), MBR (DL/UL)

Non-GBR type SDF QoS parameter: QCI, ARP, MBR (DL/UL)

An SDF is mapped to an EPS bearer in a P-GW and transmitted to a UE through the EPS bearer. SDFs (SDF aggregate) having the same QCI and ARP are mapped to one EPS bearer.

EPS bearer QoS: QCI and ARP are basic QoS parameters applied to all EPS bearers. EPS bearers are classified into a GBR type bearer and a non-GBR type bearer according to QCI resource type. The default bearer is of non-GBR type all the time and the dedicated bearer can be set to GBR or non-GBR. GBR type bearer QoS parameters include QCI, ARP, GBR (DL/UL) and MBR (DL/UL). Non-GBR type bearer QoS parameters include QCI, ARP, APN-AMBR (DL/UL) and UE-AMBR (DL/UL).

In addition to the QCI and ARP, the GBR type bearer is a QoS parameter and has a GBR and an MBR. This means that each bearer is allocated fixed resources. The non-GBR type bearer is a QoS parameter and has an AMBR (Aggregated Maximum Bit Rate), which means that each bearer is allocated a maximum bandwidth that can be shared with other non-GBR type bearers instead of being allocated resources. The APN-AMBR is a maximum bandwidth that non-GBR type bearers can share in the same PDN and the UE-AMBR is a maximum bandwidth that non-GBR type bearers can share in the same UE. When a UE has multiple PDN connections, the sum of APN-AMBRs of PDNs cannot exceed the UE-AMBR.

All data connections to a UE need to be performed through a radio resource configuration procedure with a BS, and data with respect to a specific RB (Radio Bearer) or LC (Logical Channel) is transmitted through an AP under the control of the BS.

Secondary System Scanning

When a specific RB or LC needs to communicate with a secondary system (e.g., WLAN), the corresponding BS can instruct a corresponding UE to perform scanning of neighbor APs.

1. RRCConnectionReconfiguration message

When this message includes measurement configuration, information for fast AP detection of the UE can be transmitted. This message can include SSIDs, beacon transmission cycles, measurement gap information and the like of neighbor APs. When a radio resource configuration is included, a field (e.g., value defining traffic characteristics according to parameters such as EPS bearer QoS type or QCI, ARP, GBR (DL/UL) and MBR (DL/UL) defined in the present invention) capable of indicating traffic characteristics can be transmitted along with the message.

2. The UE can perform scanning of APs through beacon signal reception (passive scanning) or probe Req/Rsp transmission and reception (active scanning)

3. MeasurementReport message

The UE transmits a measurement result (RSSI, UE's preferred AP and the like with respect to the corresponding AP) of a detected AP to the BS.

Secondary System Selection

When the UE detects two or more secondary systems, the BS can select a most suitable system using the following metric and notify the UE of the most suitable system (same operator, UE's priority, channel quality, load balancing, carried traffic, etc.).

Multi-RAT Measurement Procedure for Multi-RAT UEs
RRCConfigurationReconfiguration Message The purpose of this procedure is to modify an RRC connection, e.g. to establish/modify/release RBs, to perform handover, to setup/modify/release measurements, to add/ modify/release SCells. As part of the procedure, NAS dedicated information may be transferred from an E-UTRAN to the UE.

A multi-RAT UE may measure a secondary system even during connection with the primary system. If possible, the multi-RAT UE need not set a measurement gap with the BS. That is, the BS may indicate only a MeasurementReport transmission scheme through measurement configuration of the RRCConfigurationReconfiguration message.

MeasurementReport Message (cont.)

The purpose of this procedure is to transfer measurement results from the UE to E-UTRAN. For the measId for which the measurement reporting procedure was triggered, the UE shall set the measResults within the MeasurementReport message as follows:

1> set the measId to the measurement identity that triggered the measurement reporting;

1> set the measResultPCell to include the quantities of the PCell;

1> set the measResultServFreqList to include for each SCell that is configured, if any, within measResultSCell the quantities of the concerned SCell;

1> if the reportConfig associated with the measId that triggered the measurement reporting includes reportAddNeighMeas:

2> for each serving frequency for which measObjectId is referenced in the measIdList, other than the frequency corresponding with the measId that triggered the measurement reporting 3> set the measResultServFreqList to include within measResultBestNeighCell the physCellId and the quantities of the best non-serving cell, based on RSRP, on the concerned serving frequency;

1> if there if at least one applicable neighboring cell to report:

2> set the measResultNeighCells to include the best neighboring cells up to maxReportCells in accordance with the following:

3> if the triggerType is set to event:

4> include the cells included in the cellsTriggeredList as defined within the VarMeasReportList for this measId;

3> else:

4> include the applicable cells for which the new measurement results became available since the last periodical reporting or since the measurement was initiated or reset;

MeasurementReport message (cont.)

3> for each cell that is included in the measResultNeighCells, include the physCellId;

3> if the triggerType is set to event; or the purpose is set to reportStrongestCells or to reportStrongestCellsForSON:

4> for each included cell, include the layer 3 filtered measured results in accordance with the reportConfig for this measId, ordered as follows:

5> if the measObject associated with this measId concerns E-UTRA:

6> set the measResult to include the quantity(ies) indicated in the reportQuantity within the concerned reportConfig in order of decreasing triggerQuantity, i.e. the best cell is included first;

5> if the measObject associated with this measId concerns UTRA FDD and if ReportConfigInterRAT includes the reportQuantityUTRA-FDD:

6> set the measResult to include the quantities indicated by the reportQuantityUTRA-FDD in order of decreasing measQuantityUTRA-FDD within the quantityConfig, i.e. the best cell is included first;

5> if the measObject associated with this measId concerns UTRA FDD and if ReportConfigInterRAT does not include the reportQuantityUTRA-FDD; or 5> if the measObject associated with this measId concerns UTRA TDD, GERAN or CDMA2000:

6> set the measResult to the quantity as configured for the concerned RAT within the quantityConfig in order of either decreasing quantity for UTRA and GERAN or increasing quantity for CDMA2000 pilotStrength, i.e. the best cell is included first;

5> if the measObject associated with this measId concerns WLAN and if ReportConfigInterRAT includes the reportQuantityWLAN:

6> set the measResult to include the quantities indicated by the reportQuantityWLAN in order of decreasing measQuantityWLAN within the quantityConfig, i.e. the best cell is included first.

3> else if the purpose is set to reportCGI:

4> if the mandatory present fields of the cgi-Info for the cell indicated by the cellForWhichToReportCGI in the associated measObject have been obtained:

5> if the cell broadcasts a CSG identity:

6> include the csg-Identity;

6> include the csg-MemberStatus and set it to member if the cell is a CSG member cell;

5> if the si-RequestForHO is configured within the reportConfig associated with this measId:

6> include the cgi-Info containing all the fields that have been successfully acquired, except for the plmn-IdentityList;

5> else:

6> include the cgi-Info containing all the fields that have been successfully acquired;

MeasurementReport Message

1> if the ue-RxTxTimeDiffPeriodical is configured within the corresponding reportConfig for this measId;

2> set the ue-RxTxTimeDiffResult to the measurement result provided by lower layers;

2> set the currentSFN;

1> if the includeLocationInfo is configured in the corresponding reportConfig for this measId and detailed location information that has not been reported is available, set the content of the locationInfo as follows:

2> include the locationCoordinates;

2> if available, include the gnss-TOD-msec;

1> increment the numberOfReportsSent as defined within the VarMeasReportList for this measId by 1;

1> stop the periodical reporting timer, if running;

1> if the numberOfReportsSent as defined within the VarMeasReportList for this measId is less than the reportAmount as defined within the corresponding reportConfig for this measId:

2> start the periodical reporting timer with the value of reportInterval as defined within the corresponding reportConfig for this measId;

1> else:

2> if the triggerType is set to periodical:

3> remove the entry within the VarMeasReportList for this measId;

3> remove this measId from the measIdList within VarMeasConfig;

1> if the measured results are for CDMA2000 HRPD:

2> set the preRegistrationStatusHRPD to the UE's CDMA2000 upper layer's HRPD preRegistrationStatus;

1> if the measured results are for CDMA2000 1xRTT:

2> set the preregistrationStatusHRPD to FALSE;

1> submit the MeasurementReport message to lower layers for transmission, upon which the procedure ends;

A description will be given of definition of trigger conditions for secondary system (e.g. AP) measurement. A UE having MAC/PHY for other RATs (e.g. 11 and LTE) can report measurement results of neighbor APs when the UE satisfies a specific condition without a specific message according to the trigger conditions defined by the BS.

Initiate Measurement

A condition in which the UE starts measurement of neighbor APs can be determined by traffic transmitted through radio resource configuration (e.g., DRB addition) (according to GBR, non-GBR or the present invention). When traffic that needs to be transmitted through an AP is defined during multi-RAT capability negotiation and the traffic is generated through radio resource configuration, the UE can start AP measurement. When IEEE 802.11 (WLAN, AP) is selected as a preferred system in radio resource configuration, the UE can start measurement of neighbor APs. Measurement starting metric is a UE-specific value and may be transmitted through a unicast message.

A system selection method using QoS class defined in LTE will now be briefly described. The present invention enables a BS (or a network entity such as a multi-RAT management entity) to select a system suitable for traffic using the above-defined EPS bearer types. It may be difficult to select a suitable system using the conventional data flow classification criteria (i.e., GBR or non-GBR). According to the present invention, the BS can determine transmission of a specific flow (or flows) to other RATs (e.g., WLAN, i.e., secondary system) using the above-defined EPS bearer types according to information received from the UE.

When a network entity lower than an S-GW or the BS manages flows of the multi-RAT UE, a RAT for the flows of the UE can be selected in such a manner that the BS receives information about other RATs (i.e. secondary systems) through the UE and then compares the received information with information about a serving cell (i.e. currently connected primary system) and analyzes the information so as to select an RAT for maximizing system performance. The present invention assumes that the entity for performing such operation is the BS.

If a network entity higher than the P-GW can manage RATs of the UE, the network entity needs to receive status information of the UE and heterogeneous networks such as cellular/WLAN.

The measurement principle will now be briefly described.

Single measurement object for a given frequency or a given data radio bearer (DRB)

Measurement objects are specified per RAT type (E-UTRAN, UTRAN, CDMA2000, GERAN or WLAN (i.e. a network system other than cellular networks such as short-range communication and Wi-Fi networks).

Layer 3 filtering on L1 measurement results

Inter-freq. measurement performed during idle period including measurement gaps.

Multi-RAT UEs may (can) perform Inter-RAT measurement without measurement gaps.

Figure 6:
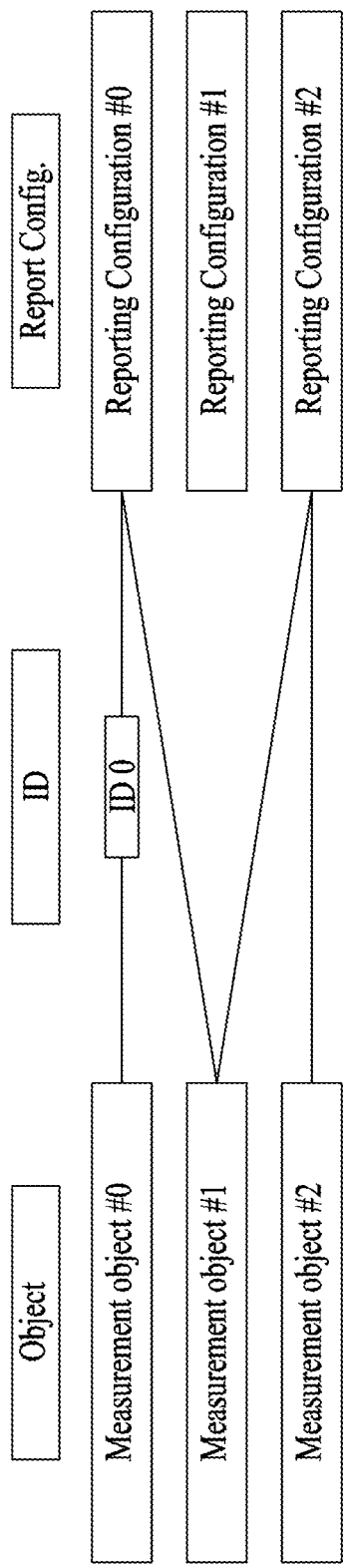
FIG. 6 illustrates measurement configuration.

FIG. 6 illustrates measurement configuration.

Referring to FIG. 6, conventional measurement configuration includes a set of WLAN carrier frequencies, a set of E-UTRA data bearers (or flows) on a single E-UTRA carrier frequency and a set of WLAN data bearers (or flows) on a single WLAN carrier frequency in addition to a single E-UTRA carrier frequency, a set of cells on a single UTRA carrier frequency, a set of GERAN carrier frequencies and a set of cells on a single (HRPD or 1×RTT) carrier frequency.

Figure 7:
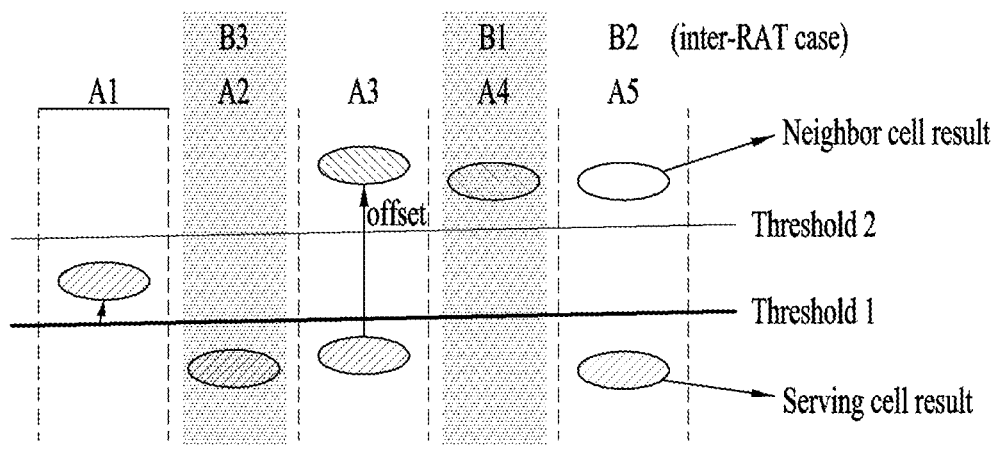
FIG. 7 illustrates inter-RAT measurement report trigger definitions.

FIG. 7 illustrates inter-RAT measurement report trigger definitions.

Parameters for the corresponding trigger conditions can be transmitted to a multi-RAT UE through reportConfigInterRAT. Inter-RAT trigger can be defined for neighbor APs (i.e., measurement object) or a different value can be defined (i.e., one measurement object is defined for DRB) according to flow characteristics. To define trigger conditions according to flow characteristics, the corresponding definitions may be unicast.

Inter-RAT measurement Report Trigger conditions

Event A1—Serving becomes better than threshold 1
Event A2—Serving becomes worse than threshold 1
Event A3—Neighbor becomes offset between than PCell
Event A4—Neighbor becomes better than threshold 2
Event A5—PCell becomes worse than threshold 1 and neighbor becomes better than threshold 2
Event A6—Neighbor becomes offset between than SCell (for CA)
Event B1—Inter-RAT neighbor becomes better than threshold
Event B2—PCell becomes worse than threshold 1 and inter-RAT neighbor becomes better than threshold 2
Event B3—Inter-RAT serving becomes worse than threshold 1

Inter-RAT measurement trigger definitions

Trigger definitions transmitted through reportConfigInterRAT can be defined for neighbor APs or a different value can be defined according to traffic characteristics.

While communication through a cellular network is preferable for voice traffic, communication through a WLAN may be preferred only when the WLAN has a very good channel state. For data traffic, communication through an AP network is preferable to communication through a cellular network even if signal intensity of the AP is weak. In these two cases, required scan results may have different thresholds according to characteristics of transmitted traffic, and thus it may be necessary to transmit trigger definitions according to traffic characteristics.

Trigger Definitions According to Flow Characteristics

When a flow is generated through radio resource configuration (e.g., DRB addition), required trigger conditions may depend on characteristics of actually transmitted traffic. Non-GBR (Non-Guaranteed Bit Rate) or GBR, or radio bearer QoS type defined in the present invention is described.

This value can be unicast to a UE since the value may be changed per flow. The present invention proposes notification of corresponding trigger definitions per flow (or RB) through RRCConnectionReconfiguration (measConfig./radioResourceConfg.) message.

"Measurement reporting by trigger condition" bit in UECapabilityInformation message Whether or not measurement reporting by the corresponding trigger conditions is needed can be set during multi-RAT capability negotiation between a UE and a BS. The UE may want communication with an AP if the AP is detected even though signal intensity of the AP is weak, and the value indicating whether or not measurement reporting by the corresponding trigger conditions is needed can be set during capability negotiation. A "measurement reporting by trigger condition" bit can be added to the UECapabilityInformation parameter (or message) and transmitted during multi-RAT capability negotiation.

Figure 8:
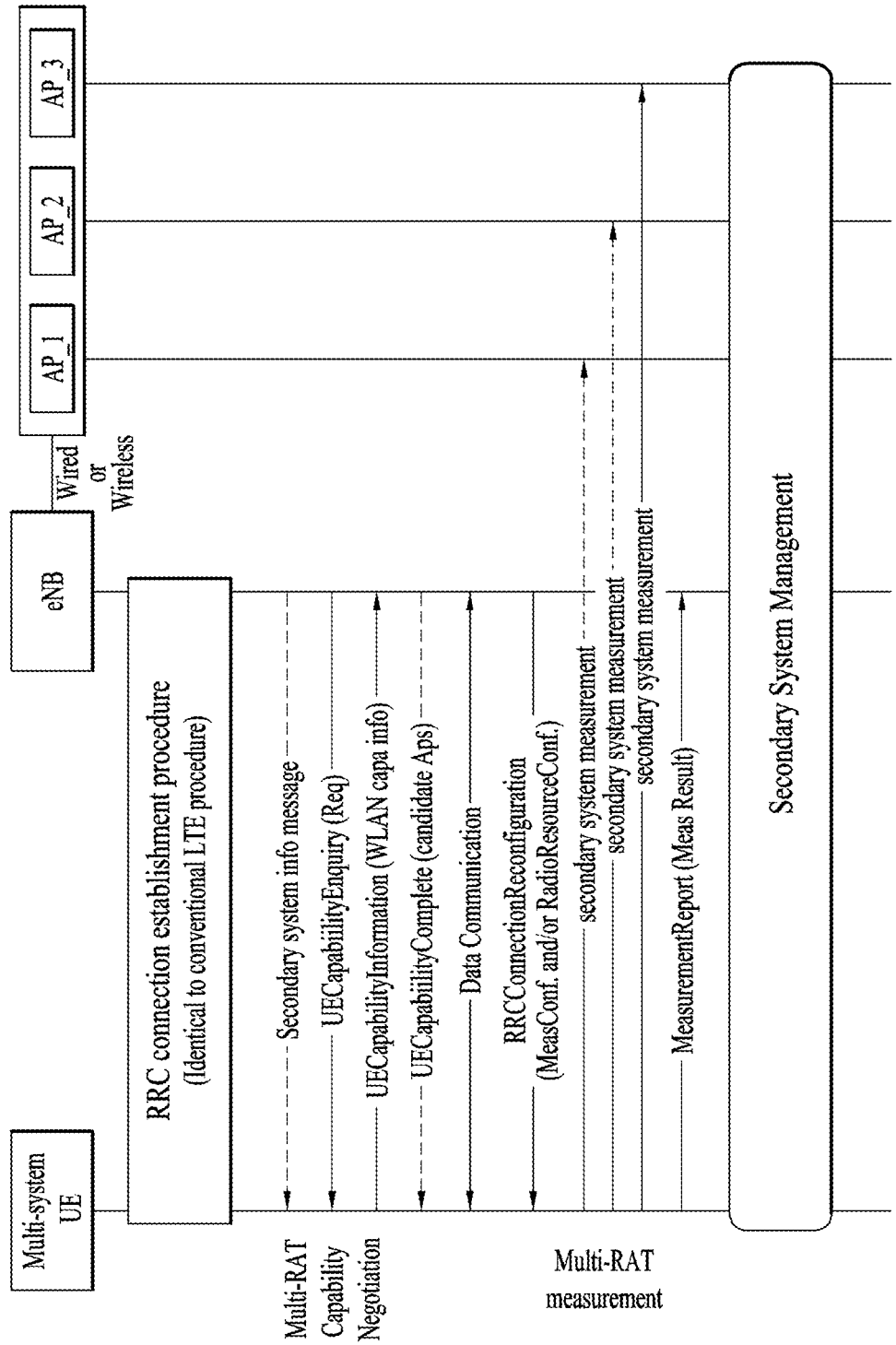
FIG. 8 illustrates a multi-RAT measurement procedure for multi-RAT UEs.

FIG. 8 illustrates a multi-RAT measurement procedure for multi-RAT UEs.

The procedure shown in FIG. 8 corresponds to part of the procedure of FIG. 4 and thus description thereof is omitted. A UE can receive measurement configuration information and/or radio resource configuration information for supporting multi-RAT measurement through the RRCConnectionReconfiguration message from the BS. The UE can perform measurement on the basis of the received information and transmit a measurement result to the BS through a MeasurementReport message or the like.

Figure 9:
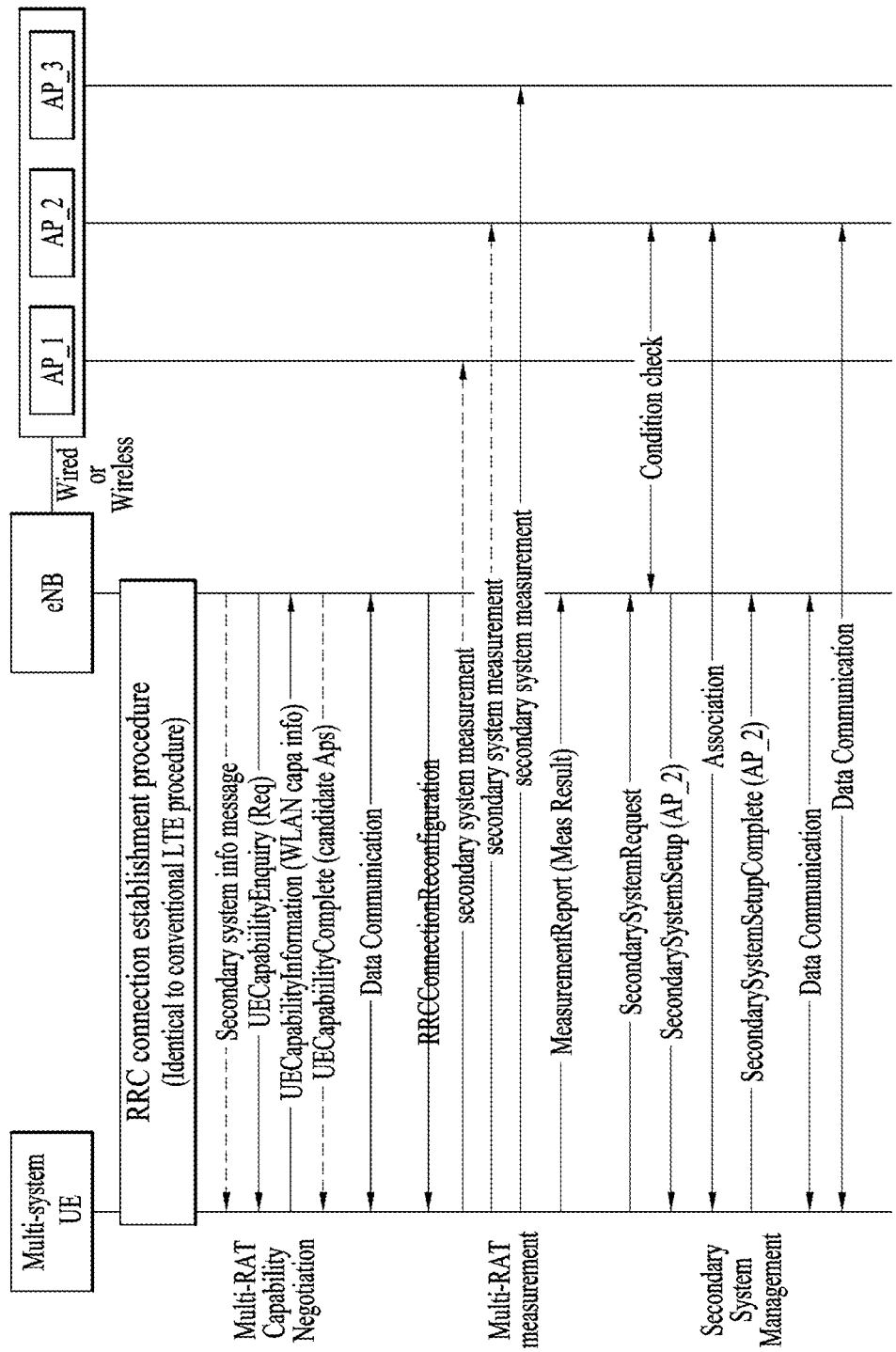
FIG. 9 illustrates an exemplary secondary system management method.

FIG. 9 illustrates a secondary system management method.

Description of a procedure shown in FIG. 9, which corresponds to the procedures of FIGS. 4 and 8, is omitted.

A message for secondary system management can be defined.

- The UE can request association with an AP (e.g., SecondarySystemRequest).
- Control for association with the AP can be performed by the BS (e.g., SecondarySystemSetup is defined). DRB (flow) information directed to a selected AP and a secondary system, information on an authentication method (open system or shared key) and the like can be transmitted.
- The UE completes association with a specific AP and TS setup according to SecondarySystemSetup of the BS. Association request/response are transmitted and received between the AP and the UE. In the case of 802.11e, a TS (Traffic Stream) setup procedure (AD-DTS request/response) can be performed.

3. The UE can notify the BS of successful association with the AP and association result (e.g., SecondarySystemSetupComplete is defined). A result of mapping between the DRB ID (or flow ID) with respect to the corresponding DRB (flow) and the AID (Association ID)/TSID (Traffic Stream ID) can be transmitted.

4. When data for a specific flow is transmitted and received through a secondary system, DL data can be redirected such that the BS transmits the DL data to the UE and UE data with respect to a DRB ID indicated by the BS can be transmitted through a WLAN.

5. Reassociation or disassociation with AP

This can be performed through SecondarySystemSetup/SecondarySystemSetupComplete messages with the BS.

Flow mobility between AP and BS: When the UE leaves the coverage of the WLAN and has no neighbor AP, the BS supports seamless flow mobility between the corresponding AP and the BS such that data, which has been transmitted through the WLAN, can be seamlessly transmitted through the BS.

Flow mobility between APs: When the UE detects a neighbor AP, the BS supports seamless flow mobility between APs in connection for the corresponding flow.

Secondary System Management Procedure

Secondary System Addition

Secondary System Addition Initiation Method

UE first initiation method: A UE, which has detected a secondary system satisfying the corresponding conditions, can request association with the corresponding system through a SecondarySystemRequest message.

BS first initiation: A BS can indicate access to a secondary system through a SecondarySystemSetup message upon recognizing that a specific flow connection (i.e., DRB addition) to a UE is generated and the UE is located in the coverage of the secondary system.

In the present invention, it is assumed that basic control is performed through the primary system (e.g., BS) and only data transmission and reception is transmitted through a secondary system (e.g., AP) as necessary.

For example, in the case of LTE, a data radio bearer is set through a radio resource configuration procedure of RRCConnectionReconfiguration. This enables QoS for corresponding data to conform the method supported by the BS (or primary system) by performing only data transmission and reception through a secondary system. DL data can be redirected by the BS and UL data with respect to a DRB ID indicated by the BS can be transmitted through a WLAN (i.e., secondary system).

Data needs to be transmitted to the UE through the radio resource configuration procedure and data for a specific radio bearer needs to be transmitted through a secondary system. Accordingly, data transmitted to a specific RNTI/DRB ID from among data transmitted to the BS is redirected to the AP. To this end, the BS needs to set a specific IP for the corresponding data.

Secondary System Delete

When a secondary system currently accessed by the UE has a bad channel state, HO to another secondary system can be requested. To this end, the UE searches (or measures) neighbor secondary systems. However, when no secondary system is detected, connection with the secondary system can be released. When data corresponding to an arbitrary flow (i.e., data bearer) of the primary system is being transmitted and received through the secondary system and the UE cannot perform flow HO to a neighbor secondary system, the BS needs to support multi-RAT seamless flow mobility such that seamless flow mobility can be performed without generating data loss for the corresponding flow.

When transmission of the data that is being transmitted to the secondary system is completed, connection with the secondary system can be released.

Secondary System Change

Flow HO between secondary systems (only for specific data bearer(s))

The UE can perform seamless flow HO between APs. The BS can notify the UE that data is not transmitted/received to/from the UE through the current serving secondary system using a SecondarySystemSetup message and instruct previously transmitted data to be transmitted and received using a new secondary system through the primary system.

Figure 10:
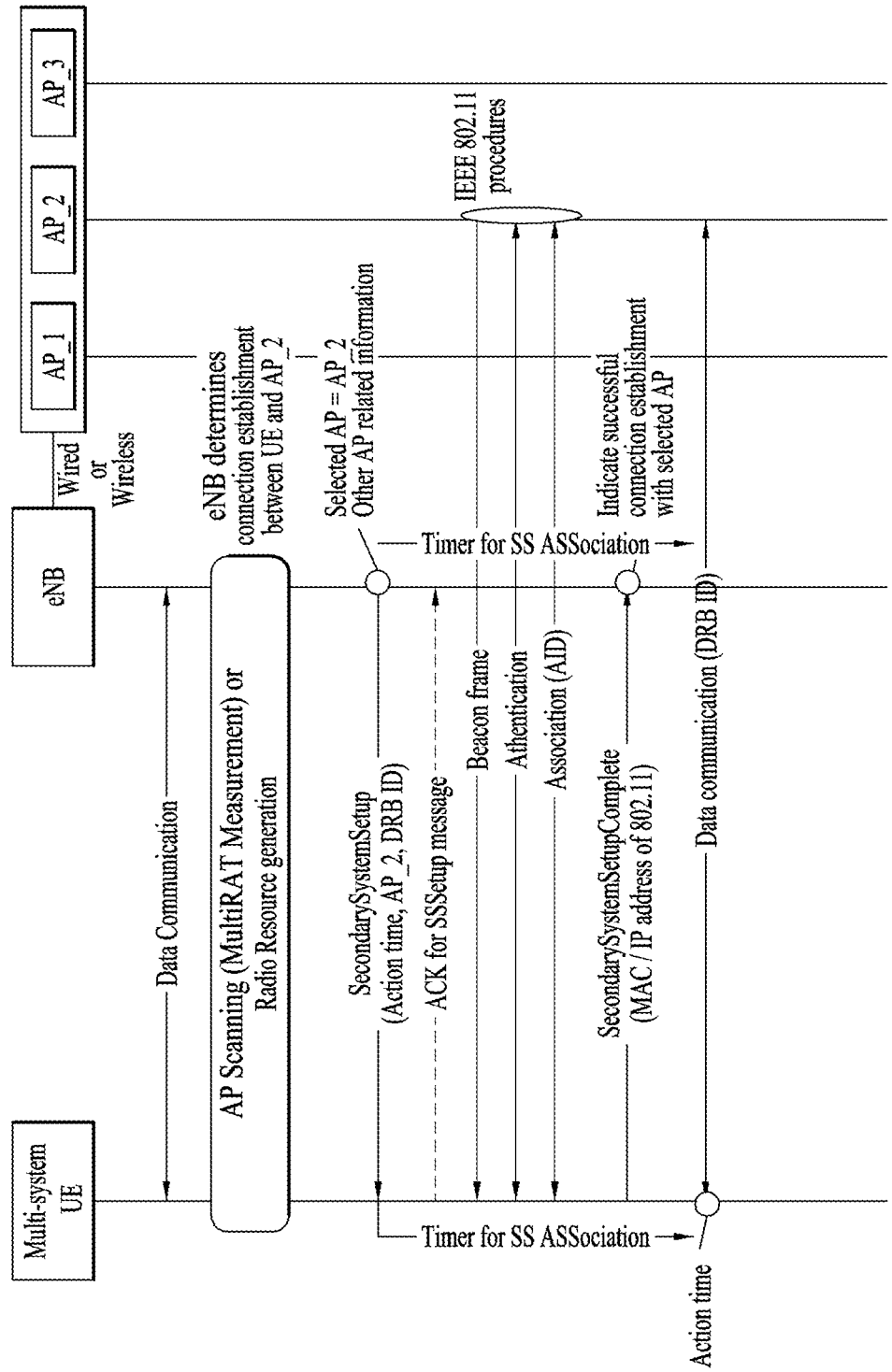
FIG. 10 illustrates an exemplary secondary system association procedure.

FIG. 10 illustrates a secondary system association procedure.

The BS can transmit, to the UE, the SecondarySystemSetup message including information such as information on a selected AP, flow (DRB) information to be transmitted to a secondary system, an authentication method (shared key information), information on whether to switch to a doze mode after association, a timer for secondary system association and action time. The UE can enter a power saving mode after association, which can be indicated to the UE by the BS.

1. Synchronization & Timer for secondary system association start

The UE can perform synchronization with an AP by receiving a beacon frame of the AP.

2. Authentication

The UE performs authentication using an open system or a shared key.

3. Association

The UE can be allocated an AID through transmission and reception of association request/response frames.

The action time included in the SecondarySystemSetup message needs to be a time value after SecondarySystemSetup message transmission time+timer for secondary system association.

The UE can transmit a SecondarySystemSetupComplete message to the BS as a response to the received SecondarySystemSetup message.

Method 1. When the UE has successfully performed synchronization/authentication/association with the specific AP, the UE can transmit, to the BS, a SecondarySystemSetupComplete message including a value that indicates successful connection establishment with the AP. The message can include a status value indicating success/fail. Upon reception of the SecondarySystemSetupComplete message corresponding to "Fail", the BS needs to transmit a SecondarySystemSetup message for selecting a new AP. In addition, the UE can notify the BS of an IP address value allocated by the AP connected thereto.

Method 2. When the UE has successfully performed synchronization/authentication/association with the corresponding AP, the UE can transmit a SecondarySystemSetupComplete message indicating successful connection establishment with the AP to the BS. When transmission of the message means successful AP association, the message may not be transmitted when AP association fails and the BS may continuously wait for the message. In this case, the BS needs to start a timer for secondary system association, which is set to a value considering synchronization/authentication/association, after transmission of the SecondarySystemSetup message and, when the timer expires, to select a new AP and to instruct the UE to associate with the newly selected AP. In the case of successful synchronization/authentication/association, the BS can be notified of the IP address value allocated by the connected AP through the message.

Figure 11:
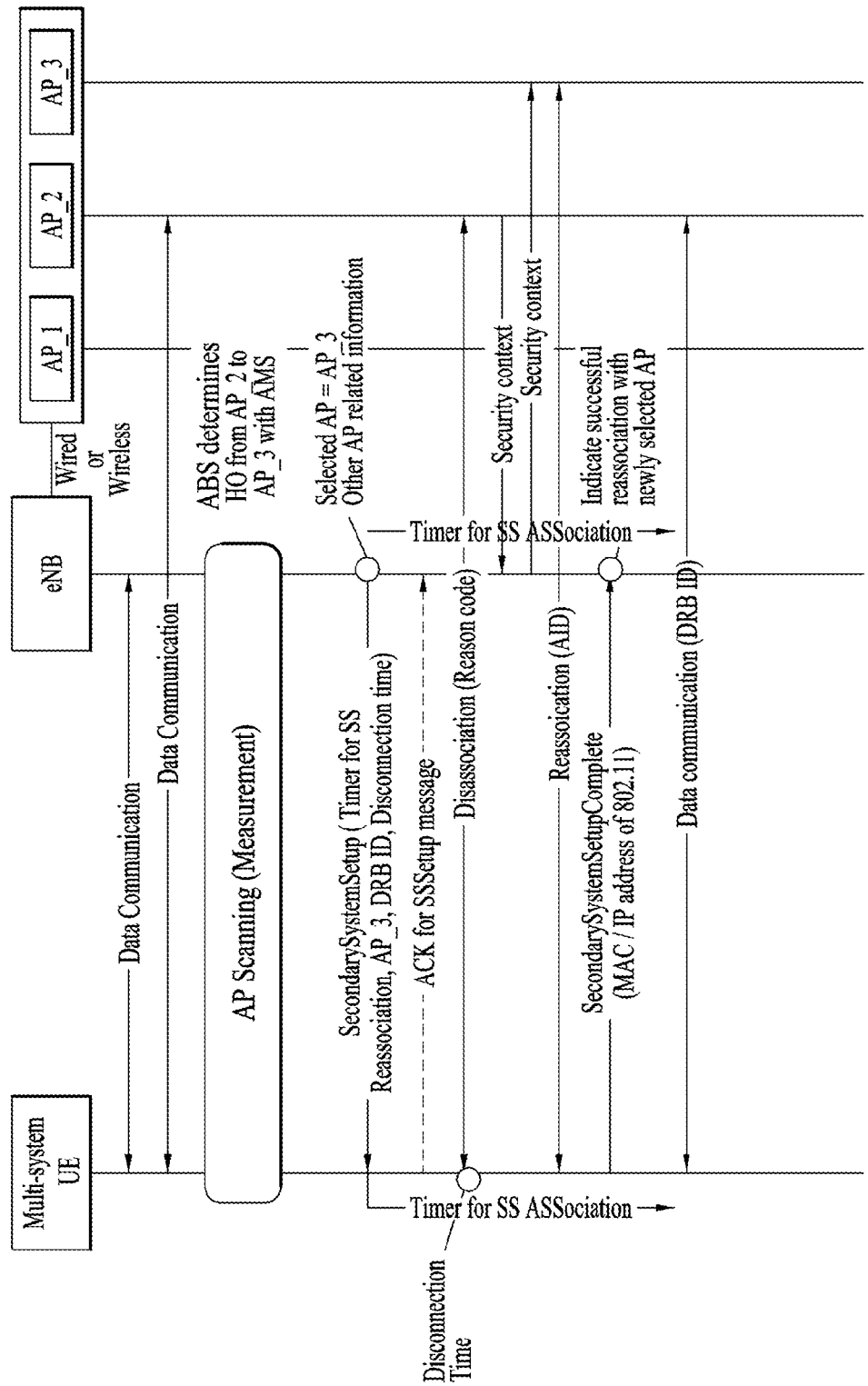
FIG. 11 illustrates an exemplary secondary system reassociation procedure.

FIG. 11 illustrates an exemplary secondary system reassociation procedure.

Secondary System Management (Reassociation)

SecondarySystemSetup

The BS can notify the UE of the newly selected AP through a SecondarySystemSetup message. The SecondarySystemSetup message can include information on the newly selected AP, DRB information to be transmitted to the secondary system, shared key information, information on whether to switch to the doze mode after reassociation, disconnection (& action) time, a timer for SS reassociation and the like.

The UE needs to disconnect from the old AP at the disconnection time and to transmit a SecondarySystemSetupComplete message before the timer for SS reassociation expires.

1. The timer for SS reassociation starts, and the ABS can transmit security information, which was set in the old AP, to the new AP through control connection (via air or backbone) during reassociation.

2. The old AP is disconnected at the disconnection time (or disassociation notification is transmitted).

3. The UE transmits reassociation request/response frames to/from the new AP.

SecondarySystemSetupComplete

Method 1. When the UE has succeeded in reassociation with the corresponding AP, the UE can transmit, to the BS, a SecondarySystemSetupComplete message including a value that indicates successful connection establishment with the new AP. The message can include a status value indicating success/fail of reassociation. Upon reception of a SecondarySystemSetupComplete message corresponding to "Fail", the BS needs to transmit a SecondarySystemSetup message for selecting a new AP. Further, the UE can notify the BS of an IP address value allocated by the connected AP.

Method 2. When the UE has succeeded in synchronization/authentication/association with the corresponding AP, the UE can transmit, to the BS, the SecondarySystemSetupComplete message indicating successful connection establishment with the AP.

The BS starts a timer for SS reassociation, which is set to a value considering reassociation, after transmission of the SecondarySystemSetup message and, when this value expires, selects a new AP and instructs the UE to associate with the newly selected AP.

Figure 12:
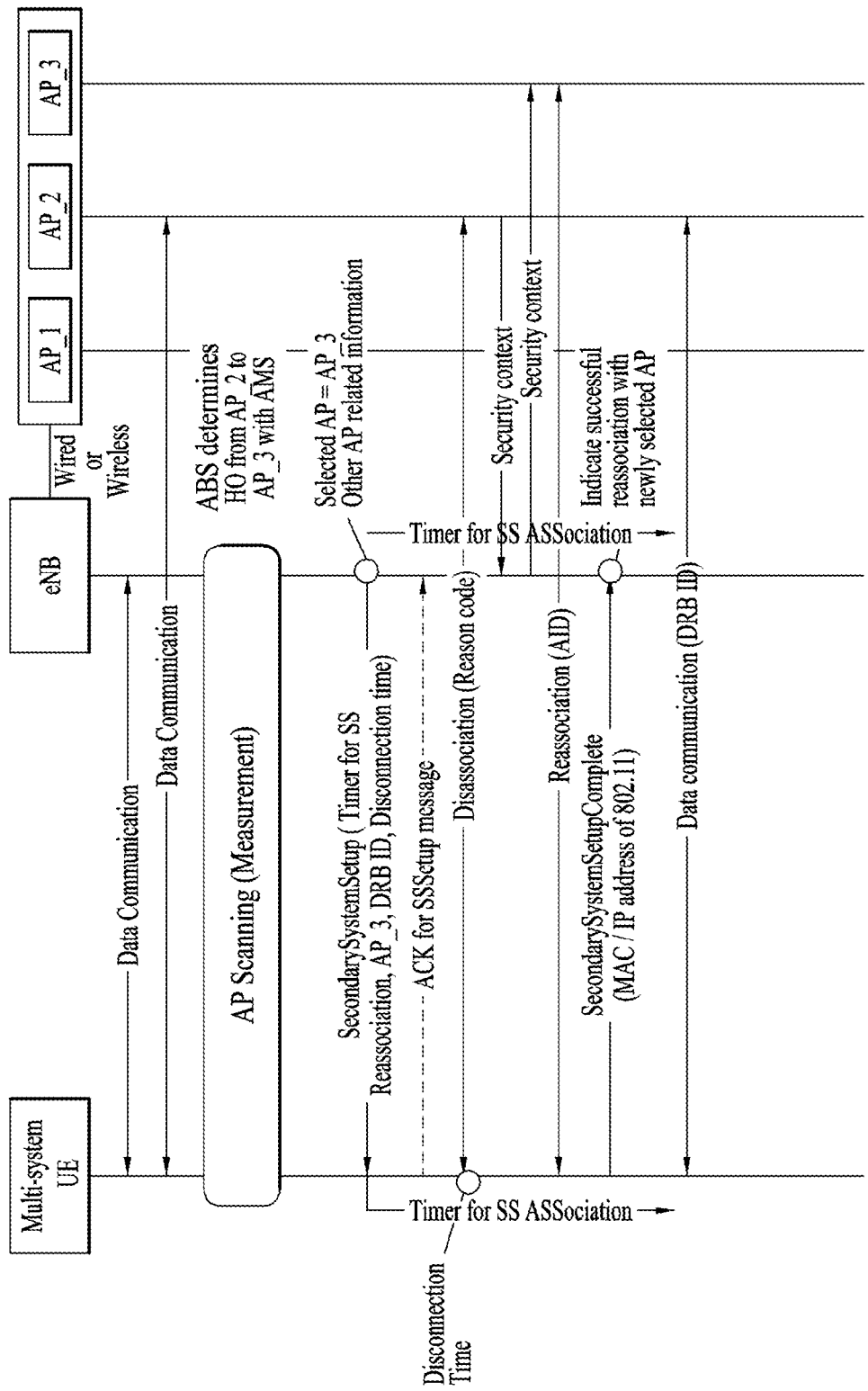
FIG. 12 illustrates another exemplary secondary system reassociation procedure.

FIG. 12 illustrates another exemplary secondary system reassociation procedure.

SecondarySystemSetup

The BS can notify the UE of information on the newly selected AP through a SecondarySystemSetup message. The SecondarySystemSetup message can include the information on the newly selected AP, DRB information to be transmitted to the secondary system, shared key information, information on whether to switch to the doze mode, disconnection (& action) time, a timer for SS reassociation and the like.

The UE is disconnected from the old AP at the disconnection time and needs to transmit a SecondarySystemSetupComplete message before the timer for SS reassociation expires.

1. The timer for SS reassociation starts, and the ABS can previously transmit security information, which was set in the old AP, to the new AP through control connection (via air or backbone) during reassociation.

2. The old AP is disconnected at the disconnection time (or disassociation notification is transmitted).

3. The UE transmits reassociation request/response frames to/from the new AP.

SecondarySystemSetupComplete

Method 1. When the UE has succeeded in reassociation with the corresponding AP, the UE can transmit, to the BS, a SecondarySystemSetupComplete message including a value that indicates successful connection establishment with the new AP. The message can include a status value indicating success/fail of reassociation. Upon reception of a SecondarySystemSetupComplete message corresponding to "Fail", the BS needs to transmit a SecondarySystemSetup message for selecting a new AP. Further, the UE can notify the BS of an IP address value allocated by the connected AP.

Method 2. When the UE has succeeded in synchronization/authentication/association with the corresponding AP, the UE can transmit, to the BS, the SecondarySystemSetupComplete message indicating successful connection establishment with the AP. The BS starts a timer for SS reassociation, which is set to a value considering reassociation, after transmission of the SecondarySystemSetup message and, when this value expires, selects a new AP and instructs the UE to associate with the newly selected AP.

Figure 13:
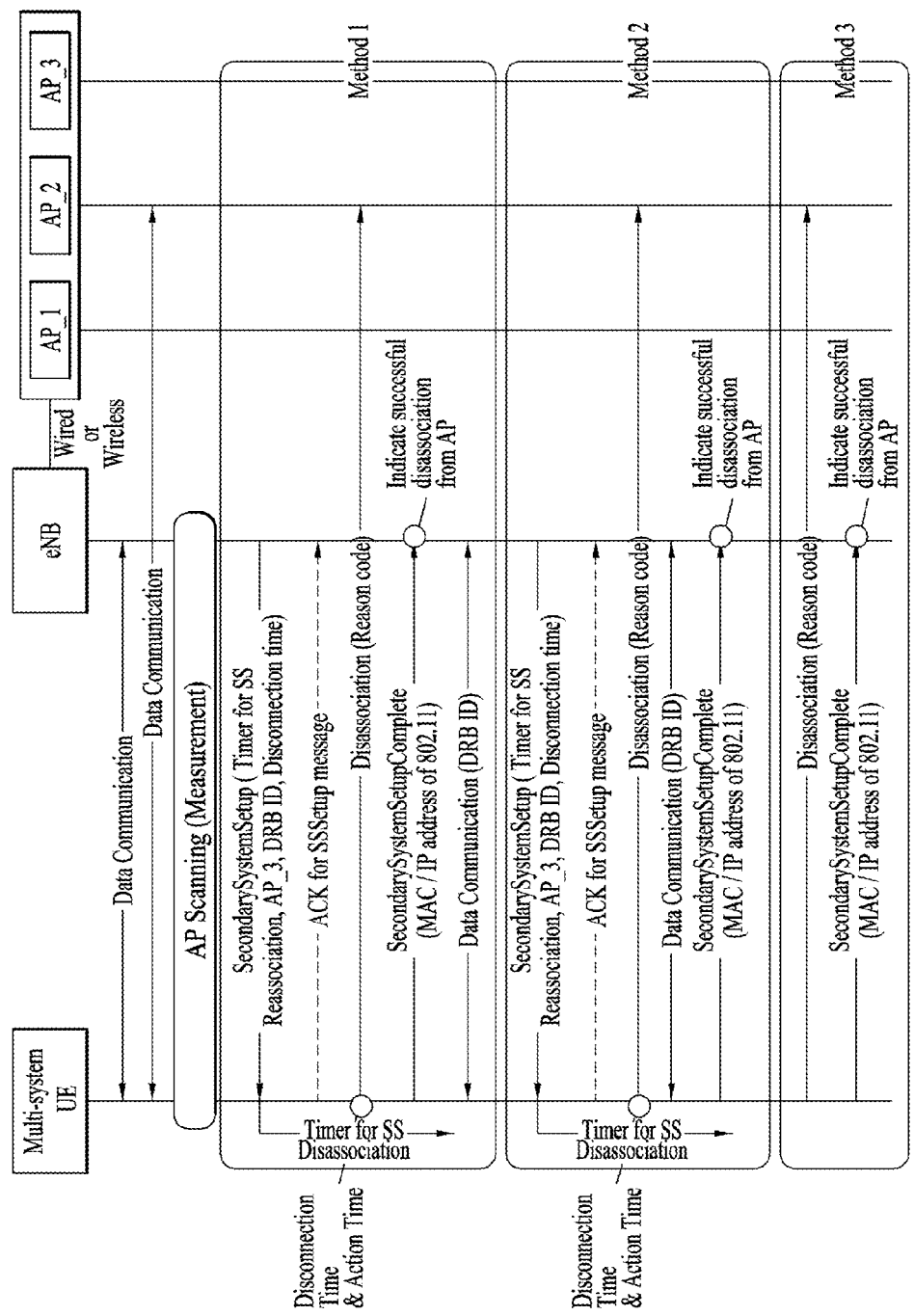
FIG. 13 illustrates an exemplary secondary system disassociation procedure.

FIG. 13 illustrates a secondary system disassociation procedure.

The secondary system disassociation procedure will now be described with reference to FIG. 13.

SecondarySystemSetup message

The BS can notify the UE of disassociation through a SecondarySystemSetup message. The SecondarySystemSetup message can include disassociation AP & DRB information, disconnection time, action time, a timer for SS disassociation and the like.

The UE is disconnected from the AP at the disconnection time. The UE can transmit a disassociation notification frame to the AP at the disconnection time.

SecondarySystemSetupComplete

Method 1. Upon reception of ACK for the disassociation notification frame, the UE can transmit a SecondarySystem- SetupComplete message including a value that indicates successful disconnection to the BS. This message can include a status value indicating success/fail of disassociation. In the case of disassociation, it is desirable to transmit only a status value indicating "Success". In addition, the UE can notify the BS of an IP address value allocated by the connected AP.

Method 2. When the UE has succeeded in synchronization/authentication/association with the corresponding AP, the UE can transmit, to the BS, a SecondarySystemSetupComplete message indicating successful connection establishment. The BS starts a timer for SS disassociation, which is set to a value in consideration of disassociation, after transmission of the SecondarySystemSetup message.

Method 3. The UE can transmit an unsolicited SecondarySystemSetupComplete message to the BS. When the UE is disconnected from the AP while a SecondarySystemSetup message is not received from the AP, the UE can notify the BS of disconnection from the AP by transmitting the SecondarySystemSetupComplete message without receiving the SecondarySystemSetup message from the BS.

Figure 14:
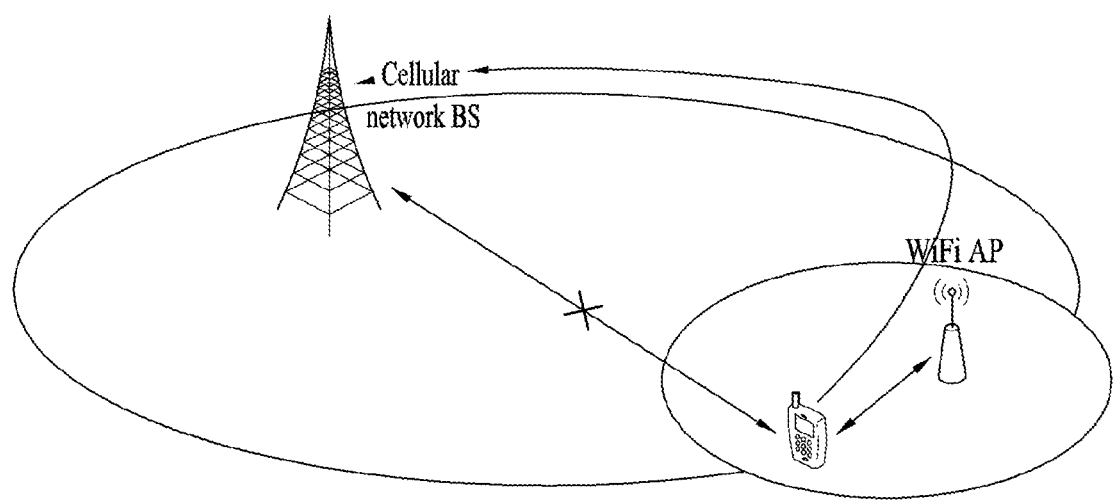
FIG. 14 illustrates a method for transmitting a link failure report according to the present invention.

FIG. 14 illustrates a method for transmitting a link failure report according to the present invention.

Link failure report (or indication) through other RAT (e.g., Wi-Fi)

The present invention enables a UE that supports simultaneous connection to a cellular link and a Wi-Fi link to indicate cellular link failure through the Wi-Fi link connected thereto when the UE detects cellular link failure.

The corresponding radio link failure report message may be a message transmitted to a serving BS of the UE or a network entity related to Wi-Fi-cellular interworking management. Upon reception of the message, the network entity or the BS recognizes that the Wi-Fi link is available although the cellular link cannot be currently used and enables an urgent control message or data being transmitted via the cellular link to be transmitted through the Wi-Fi link during cellular link recovery.

The radio link failure report message is transmitted from the UE upon detection of cellular link failure/problem and may be the same as a conventional message. Information about a Wi-Fi AP to which the message is transmitted may be added to the radio link failure report message or unnecessary information may be deleted therefrom as necessary.

For example, previous BS information, current AP information, information on a data flow transmitted through the AP, cellular related information of the UE (e.g., UE ID, failedPcell ID and location information) and the like For example, cellular network related information transmission request: when "the best measured cells" information is transmitted along with an RLF report, the BS or interworking management network entity can transmit information on the corresponding cells to the UE upon reception of the "the best measured cells" information.

When the BS or interworking management network entity receives the radio link failure (RLF) report of the UE through other RAT, the BS or interworking management network entity retains the cellular related information of the UE and enables the UE to maintain the RRC_CONNECTED state. The BS or interworking management network entity can check the state of the UE through the Wi-Fi link of the UE until recovery.

Figure 15:
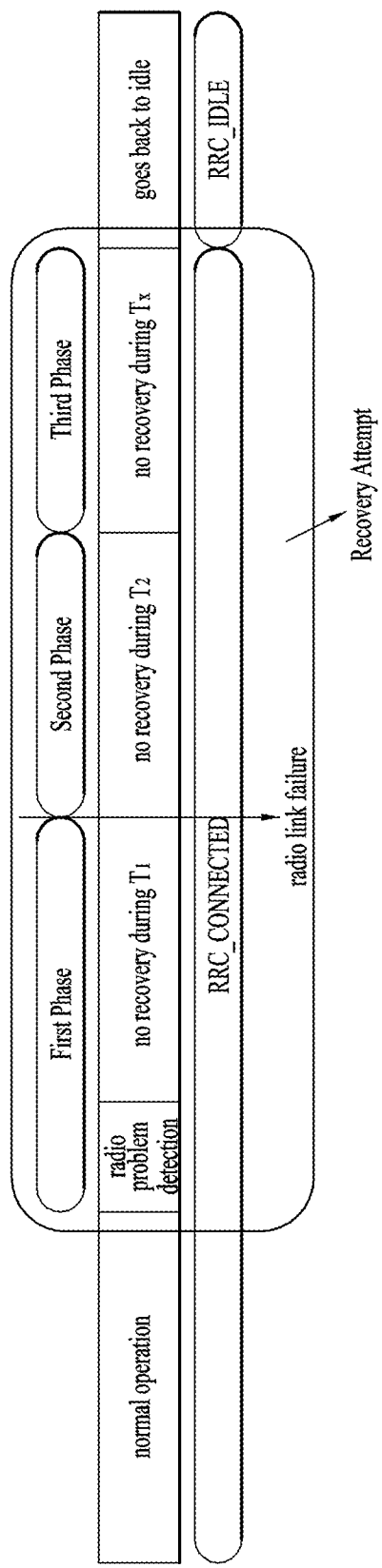
FIG. 15 illustrates radio link failure in Wi-Fi-cellular interworking.

FIG. 15 illustrates radio link failure in Wi-Fi-cellular interworking.

Referring to FIG. 15, when a UE having an available Wi-Fi link recognizes a cellular link problem or failure, the UE operates according to the following phases.

Two phases are operated in relation to radio link failure.

First phase: (recovery in phase 1: in the case of reception of in-sync in which a physical layer continues)

When out-of-sync in which a physical layer of the UE continues is received, it is determined that a radio problem is present. When radio link failure is not recovered from within a predetermined time T1, the UE recognizes radio link failure and then, when the other RAT is available, transmits a cellular radio link problem report message through the other RAT.

The first phase leads radio link failure detection. The first phase is not related to UE-based mobility and operates on the basis of a timer or other (e.g. counting) criteria (T1).

Second phase: (recovery in phase 2: in the case of successful RRC connection re-establishment)

Upon radio failure detection and handover failure, the UE transmits the cellular radio link problem report message through the other RAT link if the other RAT link is available. When a timer T311 or T301 (or other new timers) expires, the second phase leads the UE to the RRC_IDLE state.

Upon cell selection during the timer T311, the timer 301 is started and RRC connection reestablishment request/response messages can be transmitted and received for T301.

The second phase is related to UE-based mobility. The second phase operates on the basis of a timer T2 (a different timer may be set instead of T2 in the case of Wi-Fi-cellular interworking (e.g., a longer second phase or an additional third phase can be set. In this case, the RRC_CONNECED state becomes longer).

Figure 16:
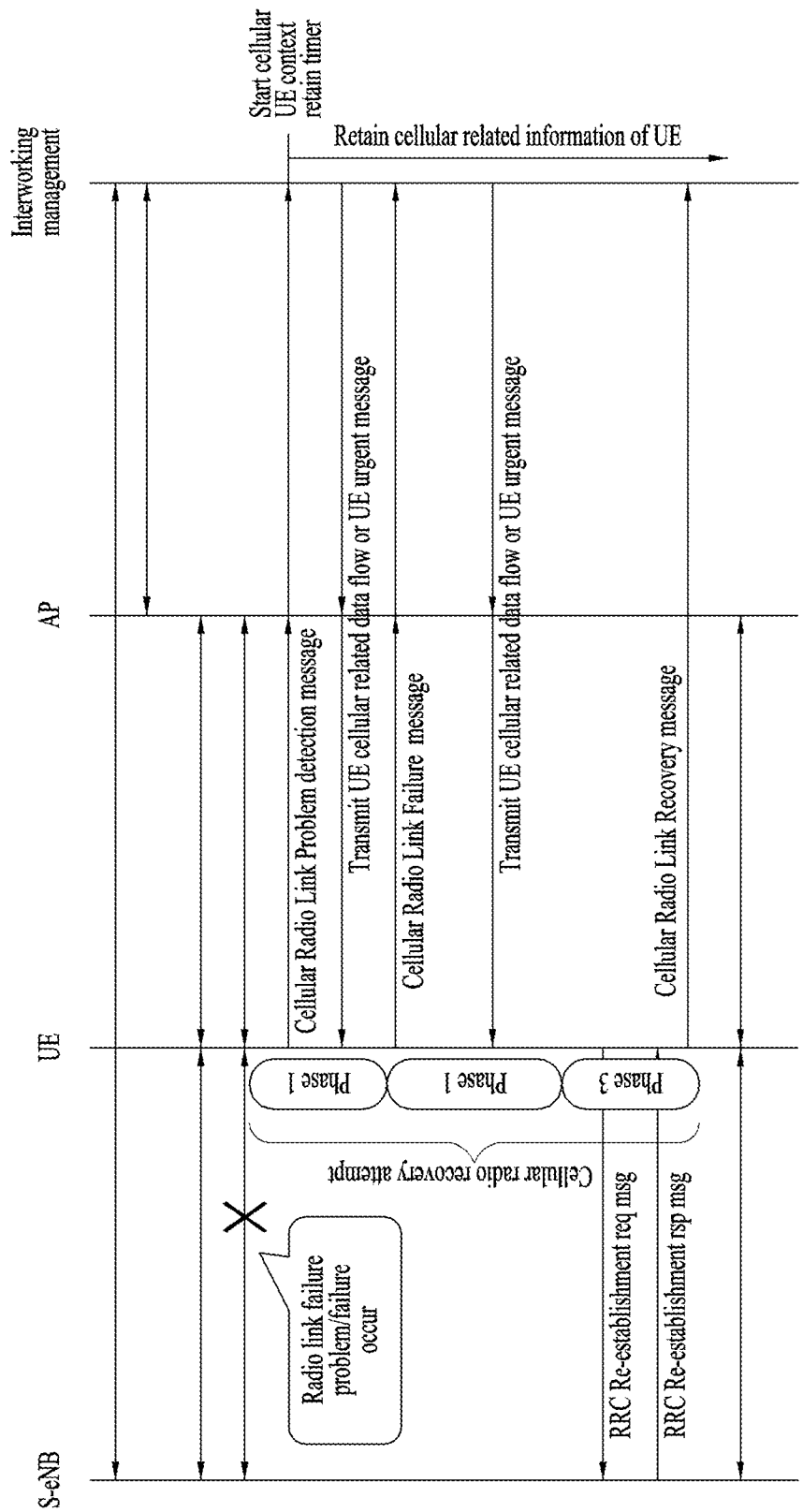
FIGS. 16 and 17 illustrate data flows of a Wi-Fi-cellular interworking UE in the case of cellular radio link failure.
Figure 17:
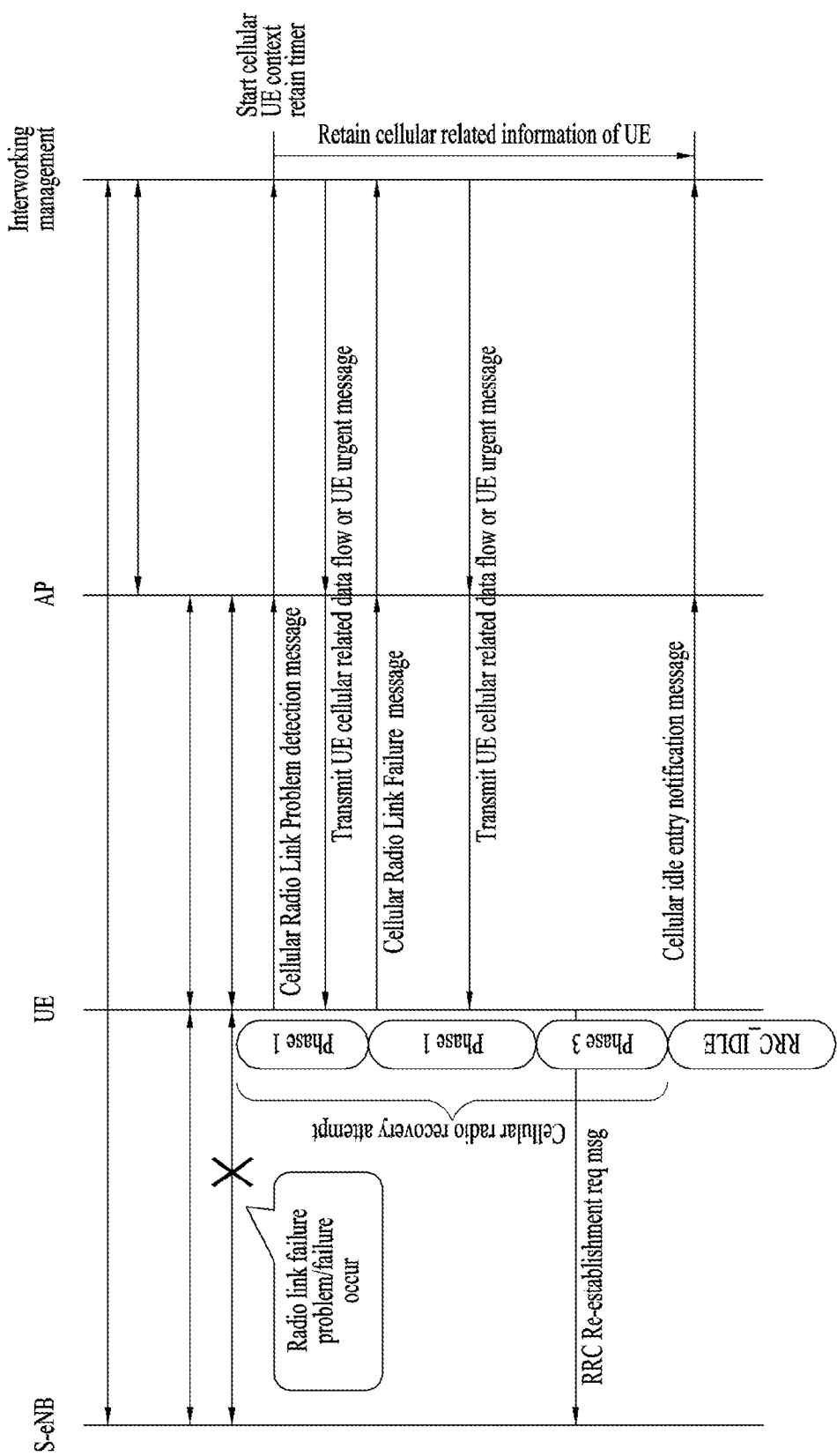

FIGS. 16 and 17 illustrate data flows of a Wi-Fi-cellular interworking UE in the case of cellular radio link failure.

More specifically, FIG. 16 shows a data flow when radio link recovery succeeds during RLF phases 1/2/3 and FIG. 17 shows a data flow when radio link recovery fails during RLF phases 1/2/3.

Referring to FIG. 16, upon occurrence of radio link failure, the UE can transmit a message indicating detection of a cellular radio link problem to the interworking management server (or BS of the cellular network, MME). In response to this message, the interworking management server (or BS of the cellular network, MME) can transmit a message for allowing the cellular related data flow to be switched to the UE via the AP. Upon recognition of radio link failure, the UE can transmit a message indicating the radio link failure to the interworking management server (or BS of the cellular network, MME).

The UE attempts (cellular) radio link recovery during RLF phases 1/2/3. Upon successful radio link recovery, the UE can perform communication with the cellular network again by transmitting an RRC re-establishment request message to the (serving) BS of the cellular network and receiving an RRC re-establishment response message as a response to the RRC re-establishment request message. The UE can transmit a message indicating cellular radio link recovery to the interworking management server (or BS of the cellular network, MME).

Referring to FIG. 17, upon occurrence of radio link failure, the UE can transmit a message indicating detection of a cellular radio link problem to the interworking management server (or BS of the cellular network, MME). In response to this message, the interworking management server (or BS of the cellular network, MME) can transmit a message for allowing the cellular related data flow to be switched to the UE via the AP. Upon recognition of radio link failure, the UE can transmit a message indicating radio link failure to the interworking management server (or BS of the cellular network, MME).

The UE attempts (cellular) radio link recovery during RLF phases 1/2/3. When radio link recovery for RLF phases 1/2/3 fails, as shown in FIG. 17, the UE can indicate the radio link failure through the available other RAT since the UE cannot transmit the RRC re-establishment request message to the BS of the cellular network. In addition, the UE can notify the interworking management server (or BS of the cellular network, MME) that the UE enters the cellular idle mode in order to indicate that the other RAT link is available. To receive the information indicating that the UE enters the cellular idle mode from the UE, the interworking management server (or BS of the cellular network, MME) needs to retain the cellular related information of the UE.

As described above, when a UE has capability of simultaneously connecting to two or more RATs, the UE notifies the interworking management entity or the serving BS that a link of a secondary RAT is available during radio link failure of the primary link so as to enable an urgent message or a data flow of the UE to be switched to the secondary RAT. This can provide seamless services to users through the secondary RAT for a period in which the primary RAT cannot be used.

Embodiments described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an exemplary embodiment of the present invention or included as a new claim by a subsequent amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention is not intended to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method by which a UE supporting multiple radio access technologies (RAT) recovers from radio link failure is industrially applicable to various communication systems such as 3GPP LTE, LTE-A and IEEE 802.

The invention claimed is:

1. A method of recovering a radio link by a user equipment (UE) supporting multiple radio access technologies, the method comprising:
   detecting a failure of a radio link of a cellular network;
   maintaining connections with the cellular network and a wireless LAN (WLAN) and transmitting a radio link failure report message to an access point (AP) via the WLAN when the failure of the radio link occurs, the radio link failure report message indicating the failure of the radio link;
   receiving data from the AP via the WLAN during recovery of the radio link; and
   transmitting a status message to the AP via the WLAN when recovery of the radio link fails, the status message indicating that the UE enters an idle state with the cellular network.

2. The method according to claim 1, further comprising:
   entering the idle state after transmitting the status message.

3. The method according to claim 1, further comprising:
   performing a Radio Resource Control (RRC) connection re-establishment procedure with a base station of the cellular network when the failure of the radio link recovers within a predetermined time duration.

4. The method according to claim 1, wherein the radio link failure report message includes information related to the AP.

5. A user equipment (UE) supporting multiple radio access technologies for recovering a radio link, the UE comprising:
   a transmitter configured to transmit information;
   a receiver configured to receive information; and
   a processor configured to:
   detect a failure of a radio link of a cellular network;
   maintain connections with the cellular network and a wireless LAN (WLAN) and control the transmitter to transmit a radio link failure report message to an access point (AP) via the WLAN when the failure of the radio link, the radio link failure report message indicating the failure of the radio link;
   control the receiver to receive data from the AP via the WLAN during recovery of the radio link; and
   control the transmitter to transmit a status message to the AP via the WLAN when recovery of the radio link fails, the status message indicating that the UE enters an idle state with the cellular network.

6. The UE according to claim 5, wherein the processor is further configured to enter the idle state after transmitting the status message.

7. The UE according to claim 5, wherein the processor is further configured to perform a Radio Resource Control (RRC) connection re-establishment procedure with a base station of the cellular network when the failure of the radio link recovers within a predetermined time duration.

8. The UE according to claim 5, wherein the radio link failure report message includes information related to the AP.

* * * * *